(12) United States Patent
Miyazaki et al.

(10) Patent No.: US 11,671,539 B2
(45) Date of Patent: Jun. 6, 2023

(54) MAINTENANCE SUPPORT SYSTEM AND MAINTENANCE SUPPORT METHOD

(71) Applicant: TOSHIBA TEC KABUSHIKI KAISHA, Tokyo (JP)

(72) Inventors: Sou Miyazaki, Sunto Shizuoka (JP); Hiroyo Tanaka, Tokyo (JP); Kazuhiro Ogura, Hiratsuka Kanagawa (JP); Masaki Narahashi, Tokyo (JP); Satoshi Oyama, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/499,786

(22) Filed: Oct. 12, 2021

(65) Prior Publication Data
US 2022/0070311 A1     Mar. 3, 2022

Related U.S. Application Data

(63) Continuation of application No. 17/014,708, filed on Sep. 8, 2020, now Pat. No. 11,178,295.

(30) Foreign Application Priority Data

Sep. 10, 2019    (JP) .............................. JP2019-164702

(51) Int. Cl.
    *H04N 1/00*        (2006.01)
    *H04N 1/32*        (2006.01)

(52) U.S. Cl.
    CPC ..... *H04N 1/00344* (2013.01); *H04N 1/00079* (2013.01); *H04N 1/00347* (2013.01);
(Continued)

(58) Field of Classification Search
    CPC .......... H04N 1/00344; H04N 1/00079; H04N 1/00347; H04N 1/32101; H04N 1/32625; H04N 2201/0094
(Continued)

(56) References Cited

U.S. PATENT DOCUMENTS 7,489,881 B2    2/2009   Yasukawa et al.
8,649,047 B2    2/2014   Martin
(Continued)

FOREIGN PATENT DOCUMENTS

JP     2013-069044 A     4/2013

OTHER PUBLICATIONS

Miyauchi et al., JP 2013069044, Maintenance Work Support Device, Maintenance Work Support System, Maintenance Work Support Method and Maintenance Work Support Program, Published 2013; (English Translation).*

*Primary Examiner* — Neil R McLean
(74) *Attorney, Agent, or Firm* — Kim & Stewart LLP

(57) ABSTRACT

A maintenance support system includes a network interface, a memory, and a processor configured to, upon receipt of first information indicating a status of a first apparatus via the network interface, store the first information in the memory, upon receipt of second information indicating a status of a second apparatus via the network interface, store the second information in the memory, and determine a priority of on-site maintenance between the first and second apparatuses based on the first and second information stored in the memory.

8 Claims, 15 Drawing Sheets

(52) U.S. Cl.
CPC ..... *H04N 1/32101* (2013.01); *H04N 1/32625* (2013.01); *H04N 2201/0094* (2013.01)

(58) Field of Classification Search
USPC ........................................................ 358/1.14
See application file for complete search history.

(56) References Cited

U.S. PATENT DOCUMENTS

| | | |
|---|---|---|
| 10,832,226 B2 * | 11/2020 | Nakajima .......... G06Q 30/0283 |
| 2016/0065752 A1 | 3/2016 | Takagi et al. |
| 2017/0004429 A1 * | 1/2017 | Maenishi ........... G05B 19/4188 |
| 2017/0310765 A1 | 10/2017 | Yeung et al. |
| 2019/0025811 A1 | 1/2019 | Nakajima et al. |

* cited by examiner

FIG. 4

| MANUFACTU-RING INFORMATION | USER ID | MAINTENANCE PERSON ID | IMPORTANT MONTH | CALL GENERA-TION RATE | MAINTENANCE START DATE | REUSED TONER DETERMI-NATION | CONTRACT TERM | NUMBER OF PRINTED SHEETS | NUMBER OF READ SHEETS | MODEL NAME | MAINTENANCE PRIORITY |
|---|---|---|---|---|---|---|---|---|---|---|---|
| AAA000001 | User001 | dealer001 | 3 | 55% | 2015-08-09 | False | 2020-08-09 | 22345 | 13210 | modelA | 5.2 |
| AAA000002 | User001 | dealer001 | 3 | 50% | 2016-03-31 | True | 2021-03-31 | 14645 | 3210 | modelA | 4.5 |
| AAA000003 | User001 | dealer002 | 12 | 35% | 2017-12-10 | True | 2020-12-10 | 7345 | 1310 | modelB | 0.0 |
| AAA000004 | User002 | dealer002 | 9 | 70% | 2019-06-30 | False | 2023-06-30 | 5345 | 990 | modelB | 2.0 |
| ... | ... | ... | ... | ... | ... | ... | ... | ... | ... | ... | ... |

FIG. 5

| ERROR IDENTIFICATION INFORMATION | MANUFACTURING INFORMATION | DATE AND TIME | ERROR CODE | SNAPSHOT |
|---|---|---|---|---|
| Err001 | AAA000001 | 2019-01-01 10:00:00 | E001 | ... |
| Err002 | AAA000001 | 2019-01-10 15:30:00 | E002 | ... |
| Err003 | AAA000001 | 2019-02-01 12:00:00 | E001 | ... |
| ... | ... | ... | ... | ... |

FIG. 6

| MANUFACTURING INFORMATION | DATE AND TIME | NUMBER OF CONNECTED DEVICES |
|---|---|---|
| AAA000001 | 2019-01-01 10:00:00 | 100 |
| AAA000001 | 2019-01-02 10:00:00 | 100 |
| AAA000001 | 2019-02-03 10:00:00 | 120 |
| ... | ... | ... |

FIG. 7

| MANUFACTURING INFORMATION | COMPONENT NAME | MANUFACTURING LOT NUMBER | REPLACEMENT DATE | COUNTER VALUE | COMPONENT SERVICE LIFE COUNTER VALUE |
|---|---|---|---|---|---|
| AAA000001 | AAA | A001 | 2019-07-09, 2018-01-12 | 12345 | 20000 |
| AAA000001 | BBB | B002 | 2019-03-31 | 23456 | 20000 |
| AAA000001 | CCC | C002 | 2018-12-10 | 34567 | 30000 |
| ... | ... | ... | ... | ... | ... |

FIG. 8

| COMPONENT NAME | CAUTION LOT NUMBER |
|---|---|
| AAA | A001 |
| AAA | A002 |
| BBB | B002 |

FIG. 9

| CALL INFORMATION | USER ID | CALL TYPE | DATE | CALL CONTENT |
|---|---|---|---|---|
| call001 | AAA000001 | AAA | 2019-07-09 | PRINTING STAIN |
| call002 | AAA000001 | BBB | 2019-07-08 | PAPER JAM |
| call003 | AAA000001 | CCC | 2019-07-08 | OUT OF TONER |
| ... | ... | ... | ... | ... |

FIG. 10

| MAINTENANCE INFORMATION | MANUFACTURING INFORMATION | DATE AND TIME | MAINTENANCE CONTENT | CALL INFORMATION |
|---|---|---|---|---|
| Main001 | AAA000001 | 2019-07-10 | COMPONENT REPLACEMENT | call001 |
| Main002 | AAA000001 | 2019-07-09 | CLEANING INSIDE APPARATUS | call001 |
| Main003 | AAA000001 | 2019-07-07 | COMPONENT REPLACEMENT | call004 |
| ... | ... | ... | ... | ... |

FIG. 23

| USER MAINTENANCE QUALITY | | USER SCORE AVERAGE | | |
|---|---|---|---|---|
| | | HIGH | EQUAL | LOW |
| TOTAL SCORE AVERAGE | HIGH | MAINTENANCE PRIORITY DOWN | | |
| | EQUAL | | | |
| | LOW | | | MAINTENANCE PRIORITY UP |

FIG. 24

| MAINTENANCE PERSON MAINTENANCE QUALITY | | USER SCORE AVERAGE | | |
|---|---|---|---|---|
| | | HIGH | EQUAL | LOW |
| TOTAL SCORE AVERAGE | HIGH | MAINTENANCE PRIORITY UP | | |
| | EQUAL | | | |
| | LOW | | | MAINTENANCE PRIORITY DOWN |

MAINTENANCE SUPPORT SYSTEM AND MAINTENANCE SUPPORT METHOD

CROSS-REFERENCE TO RELATED APPLICATION

This application is a continuation of U.S. patent application Ser. No. 17/014,708, filed Sep. 8, 2020, which is based upon and claims the benefit of priority from Japanese Patent Application No. 2019-164702, filed Sep. 10, 2019, the entire contents of which are incorporated herein by reference.

FIELD

Embodiments described herein relate generally to a maintenance support system and a maintenance support method.

BACKGROUND

When an abnormality occurs in an image forming apparatus, the image forming apparatus can transmit information indicating an abnormality has occurred to a service center via a communication line such as the Internet or a telephone line. A maintenance person for the image forming apparatus can then determine whether on-site maintenance is required based on the transmitted information. However, the maintenance person may be responsible for maintenance of many, even hundreds, of image forming apparatuses. In such a situation, when many pieces of information indicating an abnormality has occurred are being transmitted from those image forming apparatuses, it can be difficult for the maintenance person to determine the priority of maintenance for the image forming apparatuses.

DESCRIPTION OF THE DRAWINGS

FIG. 4 is a diagram showing an image forming apparatus table according to an embodiment.

FIG. 5 is a diagram showing an error information table according to an embodiment.

FIG. 6 is a diagram showing a connected device number table according to an embodiment.

FIG. 7 is a diagram showing a component counter table according to an embodiment.

FIG. 8 is a diagram showing a caution lot table according to an embodiment.

FIG. 9 is a diagram showing a call information table according to an embodiment.

FIG. 10 is a diagram showing a maintenance information table according to an embodiment.

FIG. 23 and FIG. 24 show tables for determining how to correct the maintenance priority according to an embodiment.

DETAILED DESCRIPTION

One or more embodiments provide a maintenance support system and a maintenance support method capable of appropriately determining the priority of maintenance for image forming apparatuses.

According to one embodiment, a maintenance support system comprises a network interface, a memory, and a processor configured to, upon receipt of first information indicating a status of a first apparatus via the network interface, store the first information in the memory, upon receipt of second information indicating a status of a second apparatus via the network interface, store the second information in the memory, and determine a priority of on-site maintenance between the first and second apparatuses based on the first and second information stored in the memory. In some examples, the first and second apparatus may each be image processing apparatuses such a printers or multifunctional peripherals.

Hereinafter, a maintenance support system and a maintenance support method according to certain example embodiments will be described with reference to drawings.

Figure 1:
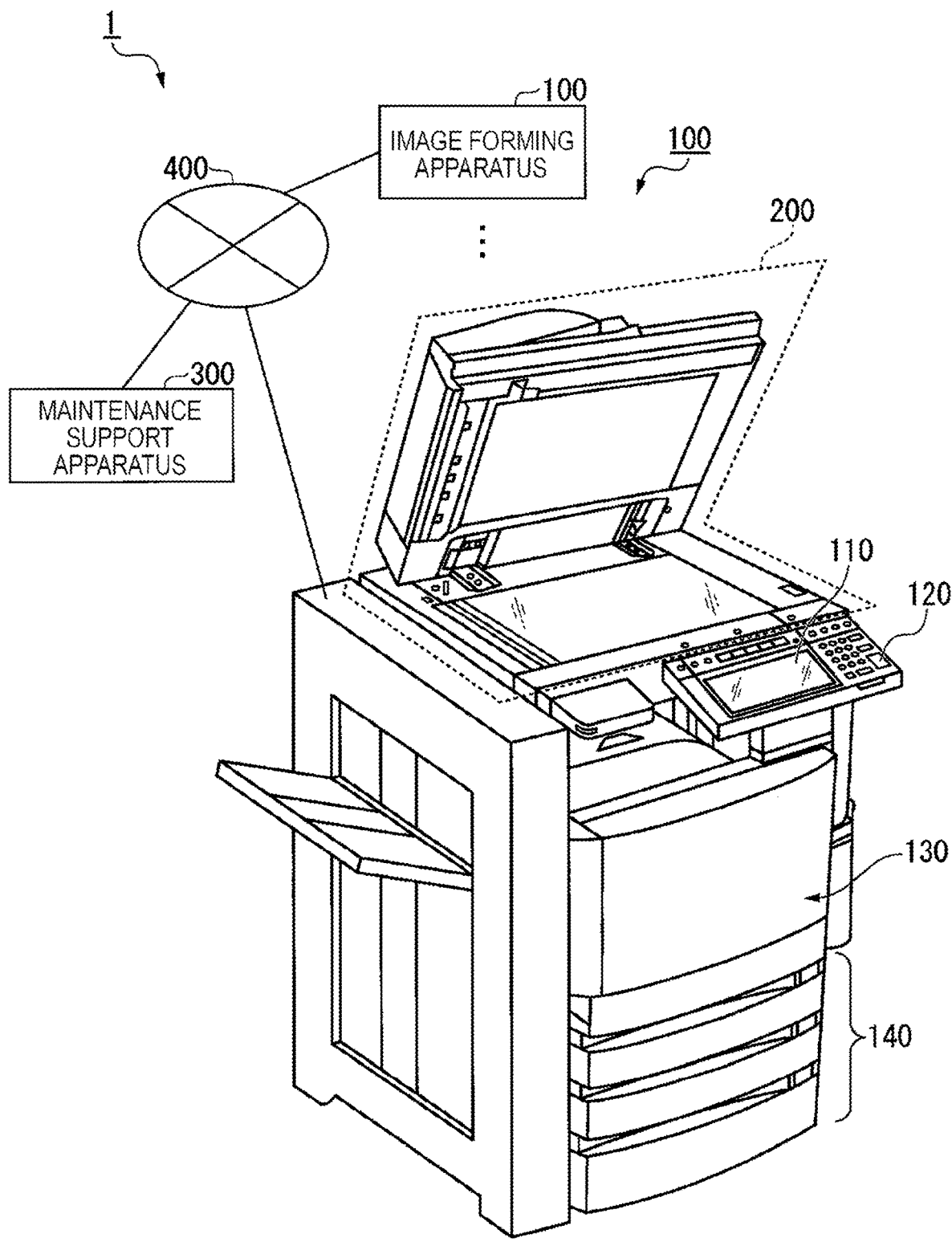
FIG. 1 is a diagram showing a configuration of a maintenance support system according to an embodiment.

FIG. 1 is a view showing a configuration of a maintenance support system 1 according to an embodiment. The maintenance support system 1 includes a plurality of image forming apparatuses 100 and a maintenance support apparatus 300. Each image forming apparatus 100 is an apparatus for forming an image on a sheet using consumables. An image forming apparatus 100 is, for example, a multifunctional peripheral or printer (MFP). The maintenance support apparatus 300 is an apparatus used for determining the priority of maintenance for each of the image forming apparatuses 100. The image forming apparatuses 100 and the maintenance support apparatus 300 are communicably connected via a network 400.

Figure 2:
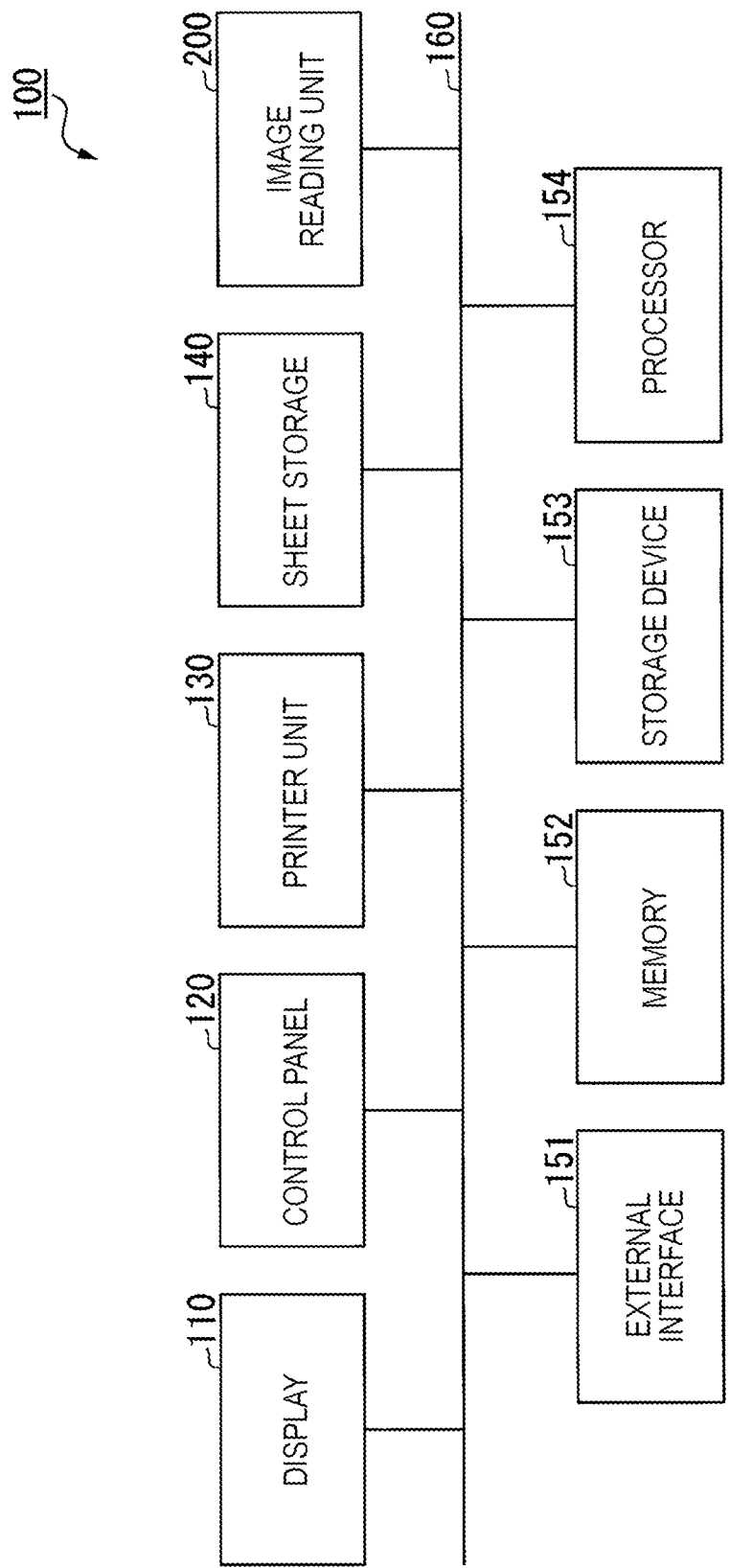
FIG. 2 is a hardware block diagram showing an image forming apparatus according to an embodiment.

FIG. 2 is a hardware block diagram of an image forming apparatus 100 according to an embodiment. First, an image forming apparatus 100 will be described using FIGS. 1 and 2. The image forming apparatus 100 includes a display 110, a control panel 120, a printer unit 130, a sheet storage unit 140, an external interface 151, a memory 152, a storage device 153, a processor 154, and an image reading unit 200. For example, the printer unit 130 of the image forming apparatus 100 is a device for fixing a toner image or an ink jet type device. Each functional unit is connected via a system bus 160 so that data communication can be made between the functional units.

The image forming apparatus 100 forms an image on a sheet using a developer such as toner or ink. When the developer is a toner, the toner is fixed on the sheet by heating. When the developer is ink, the ink is ejected onto the sheet to form an image on the sheet. The sheet is, for example, paper or label paper. In general, the sheet being printed may be any sheet as long as the image forming apparatus 100 can form an image on its surface. Examples of the toner include a decolorable toner, a non-decolorable toner, and a decorative toner. The developer is an example of a consumable used in the image forming apparatus 100.

The display 110 is an image display device, such as a liquid crystal display and an organic electro luminescence (EL) display. The display 110 can be used to display various information on the image forming apparatus 100.

The control panel 120 has a plurality of buttons, for example. The control panel 120 receives a user operation related to operations of the image forming apparatus 100. The control panel 120 outputs a signal corresponding to an input operation performed by the user to the processor 154 of the image forming apparatus 100. The display 110 and the control panel 120 may be integrated into a touch-enabled display.

The printer unit 130 forms an image on a sheet based on image information generated by the image reading unit 200 or image information received via the network 400. The printer unit 130 forms an image by the following process, for example. An image forming unit of the printer unit 130 forms an electrostatic latent image on a photosensitive drum based on the image information (print data). The image forming unit of the printer unit 130 forms a visible image by attaching a developer to the electrostatic latent image. A transfer unit of the printer unit 130 transfers the visible image onto a sheet. A fixing unit of the printer unit 130 fixes the visible image to the sheet by applying heat and pressure to the sheet. The sheet on which an image is formed may be stored in the sheet storage unit 140 or a manually inserted.

The sheet storage unit 140 stores a sheet used for image formation in the printer unit 130.

The external interface 151 is a communication interface configured to communicate with another device (for example, the maintenance support apparatus 300) via the network 400 using a particular protocol.

The memory 152 temporarily stores data used by each unit of the image forming apparatus 100. The memory 152 is, for example, a RAM (Random Access Memory). The memory 152 stores data required for operation of the image forming apparatus 100. The memory 152 may temporarily store digital data generated by the image reading unit 200. The memory 152 may temporarily store the data of the image formed in the image forming apparatus 100.

The storage device 153 is a storage device such as a magnetic hard disk device or a semiconductor storage device. The storage device 153 stores data required for operation of the image forming apparatus 100. The storage device 153 stores, for example, error information indicating the type of failure that occurs in the image forming apparatus 100.

The processor 154 controls each unit of the image forming apparatus 100. The processor 154 executes a process by loading a software program stored in the storage device 153 onto the memory 152, and executing the instructions of the software program. The processor 154 transmits predetermined information to the maintenance support apparatus 300 via the network 400 in a predefined format. The predetermined information is, for example, log information on the image forming apparatus 100. The log information includes manufacturing information of the image forming apparatus 100 (e.g., a serial number or model number), configuration information of the image forming apparatus 100, and status information for the image forming apparatus 100, such as a sensor value, a counter value, error type information, and the number of connected devices.

The image reading unit 200 reads image information formed on a sheet as bright and dark signals. The image reading unit 200 records the read image information. The recorded image information may be transmitted to another information processing device via a network. The recorded image information may be used for forming an image on a sheet by the printer unit 130.

Figure 3:
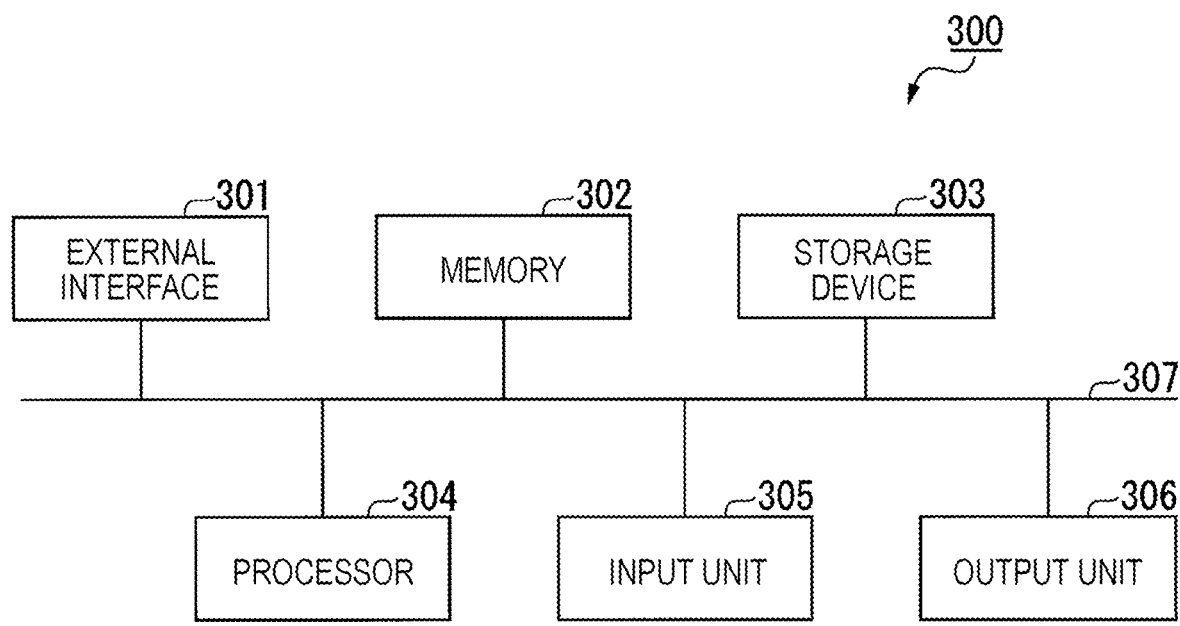
FIG. 3 is a block diagram showing a hardware configuration of a maintenance support apparatus according to an embodiment.

FIG. 3 is a block diagram showing a hardware configuration of the maintenance support apparatus 300 according to an embodiment. The maintenance support apparatus 300 includes an external interface 301, a memory 302, a storage device 303, a processor 304, an input unit 305, and an output unit 306. Each unit is connected via a system bus 307 so that data communication can be made.

The external interface 301 is a communication interface configured to communicate with another device (for example, an image forming apparatus 100) via the network 400 using a particular protocol.

The memory 302 temporarily stores data used by each unit of the maintenance support apparatus 300. The memory 302 is, for example, a RAM. The memory 302 stores data required for operation of the maintenance support apparatus 300.

The storage device 303 is a storage device such as a magnetic hard disk device or a semiconductor storage device. The storage device 303 stores data required for operation of the maintenance support apparatus 300. The storage device 303 stores, for example, a program for determining the priority of maintenance for image forming apparatuses 100. The storage device 303 stores various types of information for determining the maintenance priority of the image forming apparatuses 100. Various types of information will be described later.

The processor 304 controls each unit of the maintenance support apparatus 300. The processor 304 executes a process by loading a software program stored in the storage device 303 onto the memory 302 and executing the instructions of the software program.

The input unit 305 is an input device, such as a keyboard, a pointing device (e.g., a mouse, a tablet, and the like), a plurality of buttons, a touch panel, and the like. The input unit 305 is operated by a user to input an instruction to the maintenance support apparatus 300. The input unit 305 may be an interface for connecting an input device to the maintenance support apparatus 300. In this case, the input unit 305 receives an input signal generated according to an input of the user on the input device and transmits this received input signal to the maintenance support apparatus 300.

The output unit 306 outputs data for a user of the maintenance support apparatus 300 via an output device connected to the maintenance support apparatus 300. The output device is, for example, a device that outputs images and characters to a screen. For example, the output device is an image display device, such as a liquid crystal display, an organic EL display, an electrophoretic display, and a Cathode Ray Tube (CRT) display. In addition, the output device may be a device that prints images and characters on a sheet. For example, the output device can an ink jet printer, a laser printer, or the like. Furthermore, the output device may be a device that converts a digital signal into a sound and outputs the sound. In such a case, the output device may be a voice synthesis device and/or a voice output device (e.g., speaker). The output device may be a light emitting device such as a Light Emitting Diode (LED). The output unit 306 may be integrated into the maintenance support apparatus 300.

FIG. 4 is a diagram showing an image forming apparatus table according to an embodiment. The image forming apparatus table is stored in the storage device 303. The image forming apparatus table stores various types of information to be used for determining the maintenance priority of the image forming apparatuses 100. The image forming apparatus table has a plurality of image forming apparatus records. The image forming apparatus record has various types of information on each image forming apparatus 100. The image forming apparatus table has an image forming apparatus record for each image forming apparatus 100.

The image forming apparatus record has respective values for manufacturing information, user ID, maintenance person ID, important month, call generation rate, maintenance start date, reused toner determination, contract term, number of printed sheets, number of read sheets, model name, and maintenance priority. The manufacturing information is information for uniquely identifying the image forming apparatus 100. In general, in this context, manufacturing information may be any information as long as this information does not overlap with other manufacturing information for other image forming apparatuses 100 in an unresolvable manner. The manufacturing information is, for example, a serial number. The user ID is information for uniquely identifying the user of the image forming apparatus 100. In general, in this context, the user ID may be any information as long as this information does not overlap with other user IDs in an unresolvable manner. The user ID is, for example, a combination of numbers and characters. The maintenance person ID is information for uniquely identifying a maintenance person who is responsible for maintenance of the image forming apparatus 100. In general, in this context, the maintenance person ID may be any information as long as this information does not overlap with other maintenance person IDs in an unresolvable manner. The maintenance person ID is, for example, a combination of numbers and characters. The important month information may be a month in which it is particularly important for the user to be able to use the image forming apparatus 100. The important month is, for example, the month in which the frequency of use of the image forming apparatus 100 is highest. The important month can be separately determined for each image forming apparatus 100. A plurality of important months may be specified in some examples. In some examples, the processor 304 may independently determine the important month based on the number of printed sheets and the number of read sheets found in the image forming apparatus record. The call generation rate reflects the possibility that a user is likely to call a call center and request for a repair or maintenance. The call generation rate is calculated based on the type of error, number of cases, or number of printed sheets of minor errors that do not result in a call for a jam or the like. The call generation rate is a known measure that can be calculated every predetermined number of days. For example, the predetermined number of days may be 30 days. The call generation rate may be calculated by the image forming apparatus 100 or may be calculated by the maintenance support apparatus 300. The maintenance start date is a date on which maintenance of the image forming apparatus 100 is started. The maintenance start date is, for example, the first day of a lease contract for the image forming apparatus 100 or a maintenance start date described in a maintenance contract. The reused toner determination is a value indicating whether the toner cartridge attached to the image forming apparatus 100 is a reused (refilled) toner cartridge or otherwise a replacement toner cartridge from a non-OEM or OEM-approved source. That is, the reused toner cartridge is a non-genuine (non-OEM or OEM-approved) toner cartridge, for example, a previously exhausted OEM toner cartridge that has been collected and refilled by a reuse company. In this context, "OEM" refers to an original equipment manufacturer and/or licensed vendor or the like. When such a reused toner cartridge is being used, the reused toner determination is True. When a reused toner cartridge is not being used, the reused toner determination is False. The reused toner determination is executed by the processor 304 at a predetermined timing, e.g., when a toner cartridge is replaced. The contract term is the expiration date of the contract for the image forming apparatus 100. The contract is, for example, a lease contract, a rental contract, or a maintenance contract. The number of printed sheets indicates the total number of pages printed by the image forming apparatus 100. Whenever one sheet is printed by the image forming apparatus 100, the number of printed sheets is incremented by one. The number of read sheets indicates the total number of pages read by the image forming apparatus 100. Whenever one sheet is read by the image forming apparatus 100, the number of read sheets is incremented by one. The model name indicates a model name of the image forming apparatus 100. The maintenance priority indicates the maintenance priority for the image forming apparatus 100. The maintenance priority is calculated by the processor 304. The maintenance priority indicates the maintenance priority when an abnormality such as an error or a failure occurs in the image forming apparatus 100. The calculation of the maintenance priority will be described later.

FIG. 5 is a diagram showing an error information table according to an embodiment. The data of the error information table is stored in the storage device 303. The error information table includes various types of information for determining the maintenance priority of the image forming apparatus 100. The error information table has a plurality of error information records. Each error information record has information on an error that occurs in the image forming apparatus 100. The error information record is generated based on the error information transmitted by the image forming apparatus 100. The error information record has respective values of error identification information, manufacturing information, date and time, an error code, and a snapshot. The error identification information is information for uniquely identifying the image forming apparatus 100. The error identification information may be any information as long as the information does not overlap with other error identification information. The date and time indicate the date and time in which the error information is generated. The date and time are determined by the image forming apparatus 100 in which the error occurs. The snapshot indicates the state of the image forming apparatus 100 at the date and time in which the error information is generated. For example, the snapshot indicates the state of the number of printed sheets, the number of read sheets, the number of connected devices, the counter value, and the like. The snapshot may have any information as long as the information is related to the state of the image forming apparatus 100.

FIG. 6 is a diagram showing a connected device number table according to an embodiment. The data of the connected device number table is stored in the storage device 303. The connected device number table shows various types of information for determining the maintenance priority of the image forming apparatus 100. The connected device number table has a plurality of connected device number records. Each connected device number record indicates the number of communication devices connected to the image forming apparatus 100 identified by the manufacturing information. For example, "the communication devices connected to the image forming apparatus 100" are devices that are connected to the same network as the image forming apparatus 100 or the devices and the image forming apparatus 100 share the same network address. The connected device number record is generated based on the log information transmitted by the image forming apparatus 100. The connected device number record has respective values of manufacturing information, date and time, and the number of connected devices. The date and time indicate date and time at which the number of connected devices was determined. The date and time are provided by the image forming apparatus 100 when the number of connected devices is determined. The number of connected devices indicates the number of communication devices connected to the image forming apparatus 100 via a network at the date and time of the determination. The number of connected devices may be obtained using a known method such as fping.

FIG. 7 is a diagram showing a component counter table according to an embodiment. The data of the component counter table is stored in the storage device 303. The component counter table shows various types of information for determining the maintenance priority of the image forming apparatus 100. The component counter table has a plurality of component counter records. Each component counter record has information on the counter value of each component of the image forming apparatus 100. The component counter table is generated based on the log information transmitted by the image forming apparatus 100. The component counter record has a component counter record for each component of the image forming apparatus 100. The component counter record has respective values of manufacturing information, a component name, a manufacturing lot number, a replacement date, a counter value, and a component service life counter value. The component name indicates the name of a component of the image forming apparatus 100. The manufacturing lot number indicates the lot number of the component from which the component is manufactured. The replacement date indicates the date on which the component was previously replaced. The replacement date may have multiple values. In such a case, the component was replaced multiple times. The counter value is an index indicating the degree of use of the component. The counter value is counted up when the component is used. The component service life counter value is an index relating to the service life of the component. When the counter value is counted up to the component service life counter value, it is determined that the service life of the component reaches the end of its service life. For the counter value and the component service life counter value, other indices such as a drive time or a drive count may be used.

FIG. 8 is diagram showing a caution lot table according to an embodiment. The data of the caution lot table is stored in the storage device 303. The caution lot table shows various types of information for determining the maintenance priority of the image forming apparatus 100. The caution lot table has a plurality of caution lot records. Each caution lot record has information on a lot number at which a failure may occur for each component of the image forming apparatus 100. The data of the caution lot table is stored in the storage device 303 in advance. The caution lot table has a caution lot record for each component that may have a failure. The caution lot record has respective values of a component name and a caution lot number. The caution lot number indicates a lot number of the component at which a failure may occur.

FIG. 9 is a diagram showing a call information table according to an embodiment. The data of the call information table is stored in the storage device 303. The call information table shows various types of information for determining the maintenance priority of the image forming apparatus 100. The call information table has a plurality of call information records. Each call information record has information on a call from a user to a call center. The processor 304 generates a call information record based on the information received via the input unit 305. The input unit 305 is operated by a person at the call center that receives the call. The data of the generated call information record is stored in the storage device 303. The call information table has a call information record for each call made from a user. The call information record has respective values of call information, a user ID, a call type, date, and a call content. The call information is information for uniquely identifying a call. In general, in this context, the call information may be any information as long as this information does not overlap with other call information in an unresolvable manner. The call information may be determined according to a predetermined rule by the processor 304, for example. The call type indicates the type of issue reported from the user. The call type is determined by the person in the call center who receives the call based on the issue of the call. The date indicates the date and time in which the call is made to the call center. The call content indicates the issue reported by the user. The issue of the call may be an error that occurs in the image forming apparatus 100, for example.

FIG. 10 is a diagram showing a maintenance information table according to an embodiment. The data of the maintenance information table is stored in the storage device 303. The maintenance information table is various types of information for determining the maintenance priority of the image forming apparatus 100. The maintenance information table has a plurality of maintenance information records. Each maintenance information record has information on maintenance for the image forming apparatus 100. The processor 304 may generate a maintenance information record based on the information received via the input unit 305. The processor 304 may generate a maintenance information record based on information on the maintenance transmitted from an external communication device via the network 400. The maintenance information table has a maintenance information record for each maintenance performed for the image forming apparatus 100. The maintenance information record has respective values of maintenance information, manufacturing information, date and time, a maintenance content, and call information. The maintenance information is information for uniquely identifying maintenance for the image forming apparatus 100. The maintenance information may be any information as long as the information does not overlap with other maintenance information. The maintenance information may be determined by the processor 304 according to a predetermined rule, for example. The date indicates the date on which maintenance is performed on the image forming apparatus 100. The maintenance content indicates what maintenance is performed on the image forming apparatus 100. The call information is information for identifying the call information included in the call information table. The call information indicates based on which call the maintenance is performed.

Figure 11:
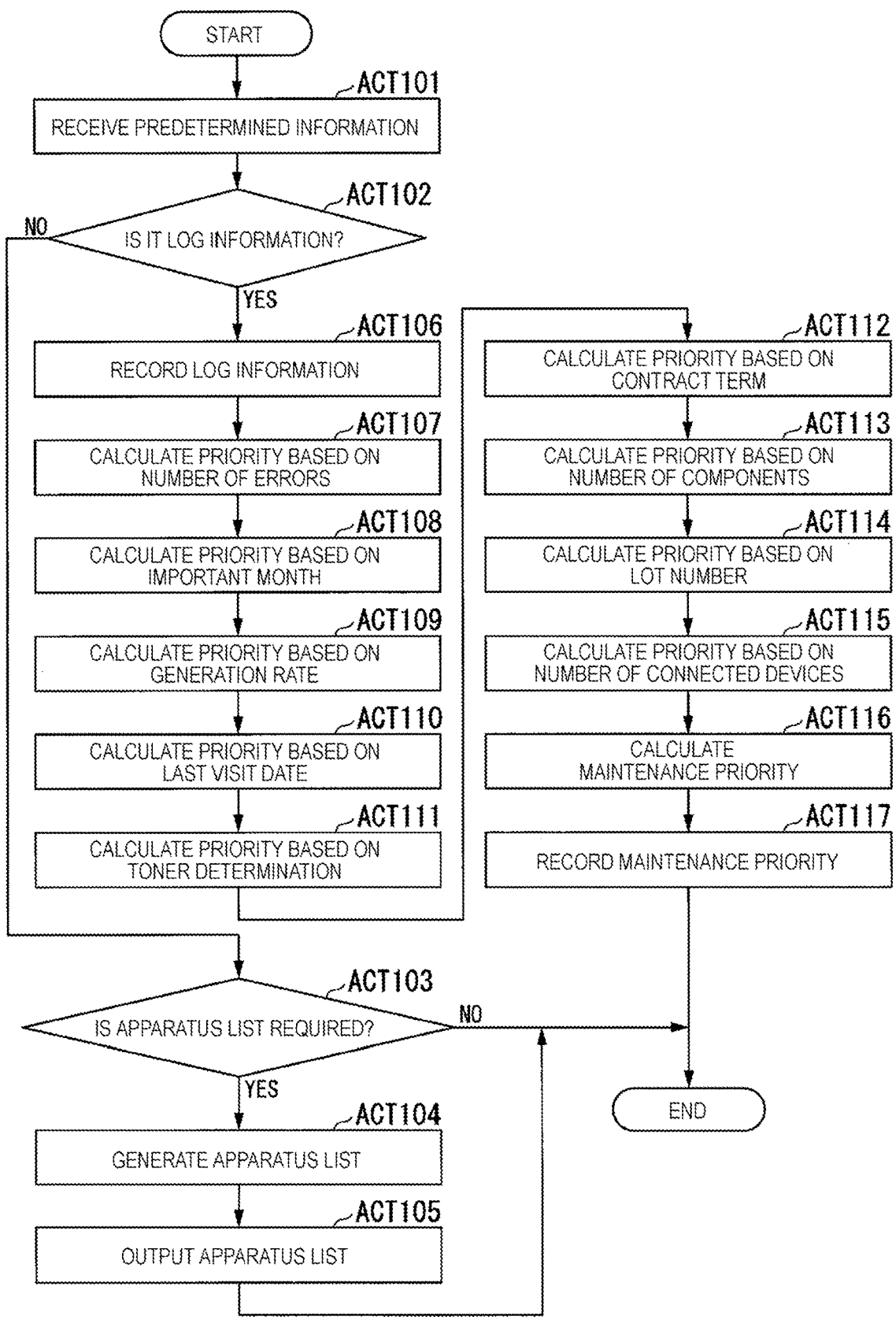
FIG. 11 is a flowchart of a priority calculation process according to an embodiment.

FIG. 11 is a flowchart showing a priority calculation process according to an embodiment. The process in FIG. 11 is executed at a predetermined timing. The process of FIG. 11 is described as a process of calculating the priority of the image forming apparatus 100 identified by predetermined manufacturing information. The external interface 301 of the maintenance support apparatus 300 receives predetermined information (ACT 101). The predetermined information may be log information, an apparatus list request, or other information. The apparatus list is information indicating a list of image forming apparatuses.

The processor 304 determines whether the predetermined information is log information (ACT 102). When the predetermined information is not log information (ACT 102: NO), the processor 304 determines whether the predetermined information is an apparatus list request (ACT 103). When the predetermined information is not the apparatus list request (ACT 103: NO), the processor 304 ends the process. When the predetermined information is an apparatus list request (ACT 103: YES), the processor 304 generates an apparatus list (ACT 104). Specifically, the processor 304 retrieves the image forming apparatus table from the storage device 303. The processor 304 acquires the manufacturing information, the model name, and the maintenance priority from the image forming apparatus table. The processor 304 generates the apparatus list by rearranging the manufacturing information, the model name, and the maintenance priority in descending or ascending order based on the maintenance priority. The processor 304 outputs the generated apparatus list to the output unit 306 (ACT 105). The processor 304 may output the apparatus list to an external device via the external interface 151 in some examples.

When the predetermined information is log information (ACT 102: YES), the processor 304 records the log information in the storage device 303 (ACT 106). Specifically, the processor 304 records information indicated by the log information in the image forming apparatus table, the error information table, the connected device number table, the component counter table, and/or the maintenance information table.

Figure 12:
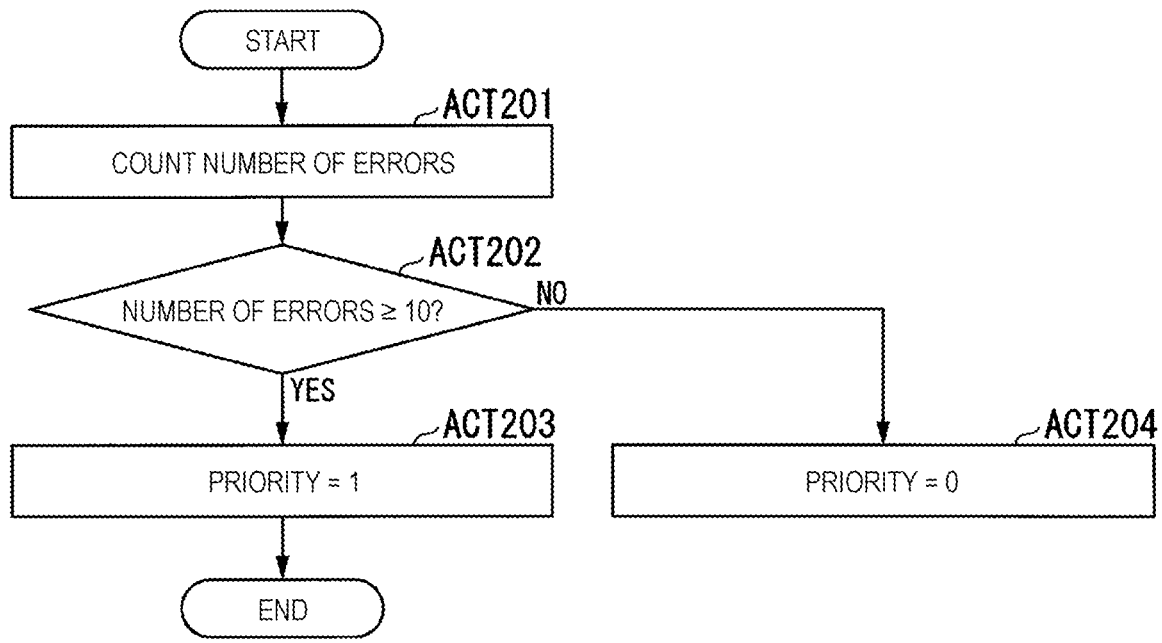
FIG. 12 is a flowchart of a priority calculation process based on the number of errors according to an embodiment.

The processor 304 calculates a priority based on the number of errors (ACT 107). Specifically, the processor 304 calculates a priority based on a flowchart shown in FIG. 12. FIG. 12 is a flowchart of a priority calculation process based on the number of errors according to an embodiment. The processor 304 counts the number of errors (ACT 201). Specifically, the processor 304 retrieves the error information table from the storage device 303. The processor 304 counts the number of pieces of error identification information indicating the date and time within one month from the present for each piece of manufacturing information. Note that "within one month from the present" is an example, and the possible embodiments are not limited to one month. For example, another period such as within two months from the present may be adopted. The processor 304 determines whether the number of counted errors is 10 or more (ACT 202). The determination condition is not limited to the number of errors being 10 or more. For example, as the determination condition, the number of errors may be 15 or more, or may be 5 or more. When the number of counted errors is 10 or more (ACT 202: YES), the processor 304 determines that the priority based on the number of errors is 1 (ACT 203). When the number of counted errors is not 10 or more (ACT 202: NO), the processor 304 determines that the priority based on the number of errors is 0 (ACT 204). The determined priority is not limited to 1 or 0. The determined priority may have a value other than 1 or 0. In addition, the processor 304 may calculate the priority based on an error generation rate (for example, MTBF: Mean Time Between Failure) within a predetermined period. Further, the processor 304 may weight the priority based on the number of generated errors or the type of the error. The weighting may be made by multiplying the calculated priority by a coefficient predetermined for the number of errors or the type of the error. In addition, the processor 304 may weight the priority based on whether the number of errors tends to increase or decrease.

Figure 13:
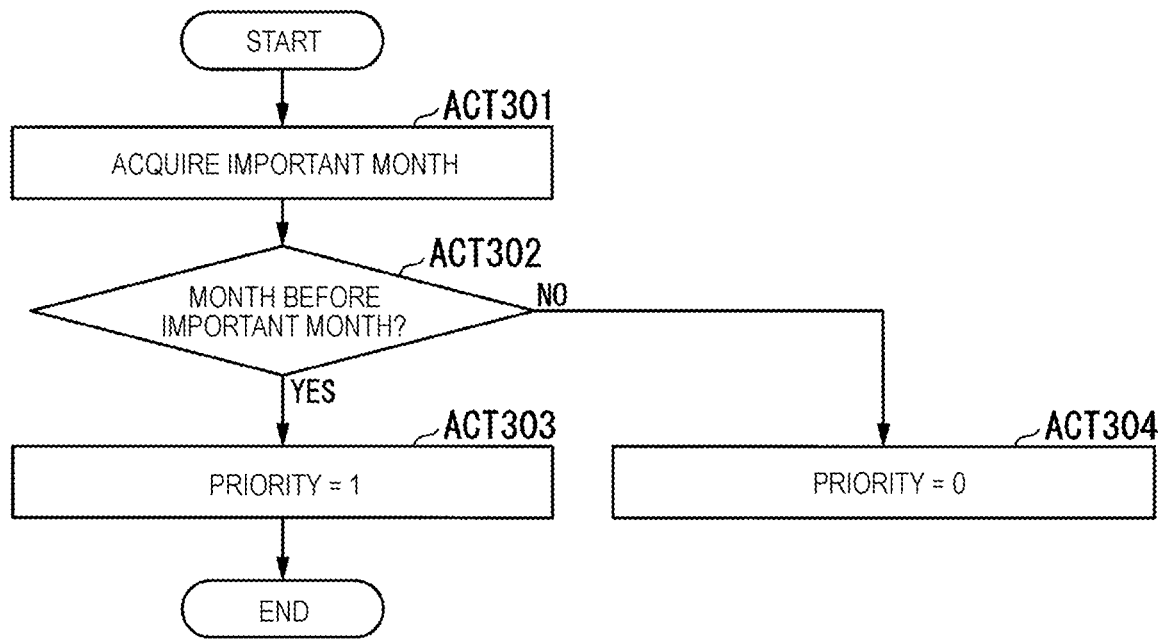
FIG. 13 is a flowchart of a priority calculation process based on an important month according to an embodiment.

Referring back to FIG. 11, the description of the flowchart will be continued. The processor 304 calculates a priority based on the important month (ACT 108). Specifically, the processor 304 determines a priority based on a flowchart shown in FIG. 13. FIG. 13 is a flowchart of a priority calculation process based on an important month according to an embodiment. The processor 304 acquires an important month (ACT 301). Specifically, the processor 304 retrieves the image forming apparatus table from the storage device 303. The processor 304 acquires the important month included in an image forming apparatus record related to the predetermined manufacturing information. The processor 304 determines whether the current month is a month before the acquired important month (ACT 302). The determination condition is not limited to the month before the important month. For example, the determination condition may be an important month or a month following the important month. When the month is a month before the important month (ACT 302: YES), the processor 304 determines that the priority based on the important month is 1 (ACT 303). If the month is not a month before the important month (ACT 302: NO), the processor 304 determines that the priority based on the important month is 0 (ACT 304). The calculated priority is not limited to 1 or 0. The determined priority may have a value other than 1 or 0. The processor 304 may determine a value larger than 1 as the priority when the current month is the month following the important month.

Figure 14:
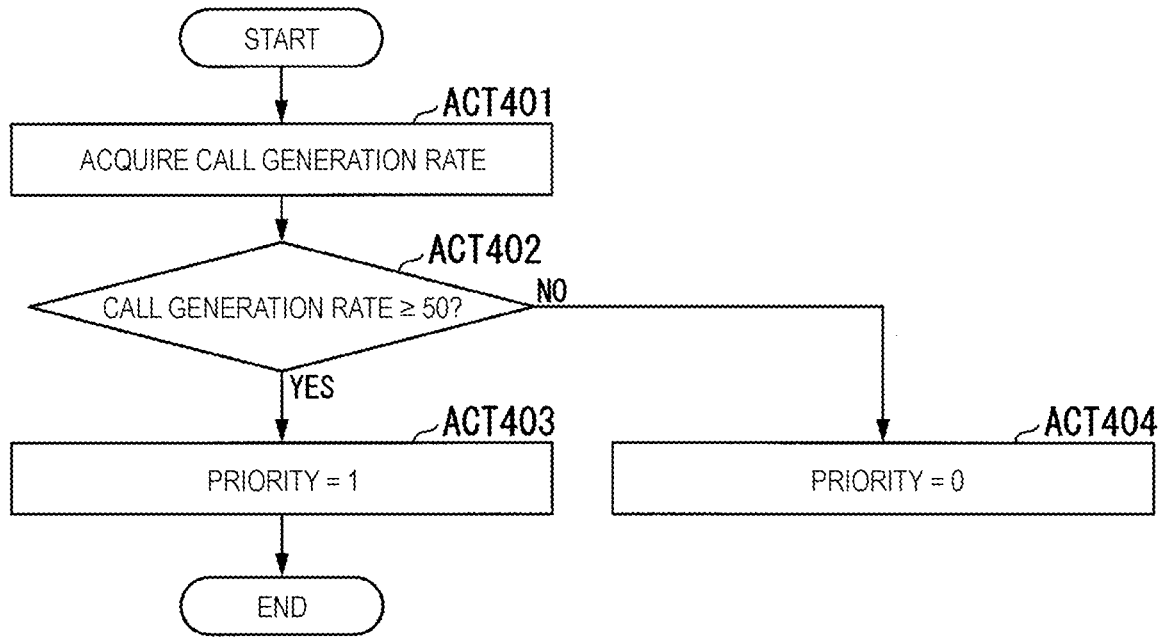
FIG. 14 is a flowchart of a priority calculation process based on a call generation rate according to an embodiment.

Referring back to FIG. 11, the description of the flowchart will be continued. The processor 304 determines a priority based on the call generation rate (ACT 109). Specifically, the processor 304 determines a priority based on a flowchart shown in FIG. 14. FIG. 14 is a flowchart of a priority calculation process based on a call generation rate according to an embodiment. The processor 304 acquires a call generation rate (ACT 401). Specifically, the processor 304 retrieves the image forming apparatus table from the storage device 303. The processor 304 acquires the call generation rate of the image forming apparatus table relating to the predetermined manufacturing information. The processor 304 determines whether the obtained call generation rate is equal to or higher than 50% (ACT 402). The determination condition is not limited to the case where the call generation rate is 50% or more. For example, as the determination condition, the call generation rate may be 40% or more, or that the call generation rate may be 60% or more. When the call generation rate is 50% or more (ACT 402: YES), the processor 304 determines that the priority based on the call generation rate is 1 (ACT 403). When the call generation rate is not 50% or more (ACT 402: NO), the processor 304 determines that the priority based on the call generation rate is 0 (ACT 404). The determined priority is not limited to 1 or 0. The determined priority may have a value other than 1 or 0. In addition, the processor 304 may determine, as the priority, a numerical value larger than 1 or a numerical value smaller than 1 according to the magnitude of the call generation rate or the user.

Figure 15:
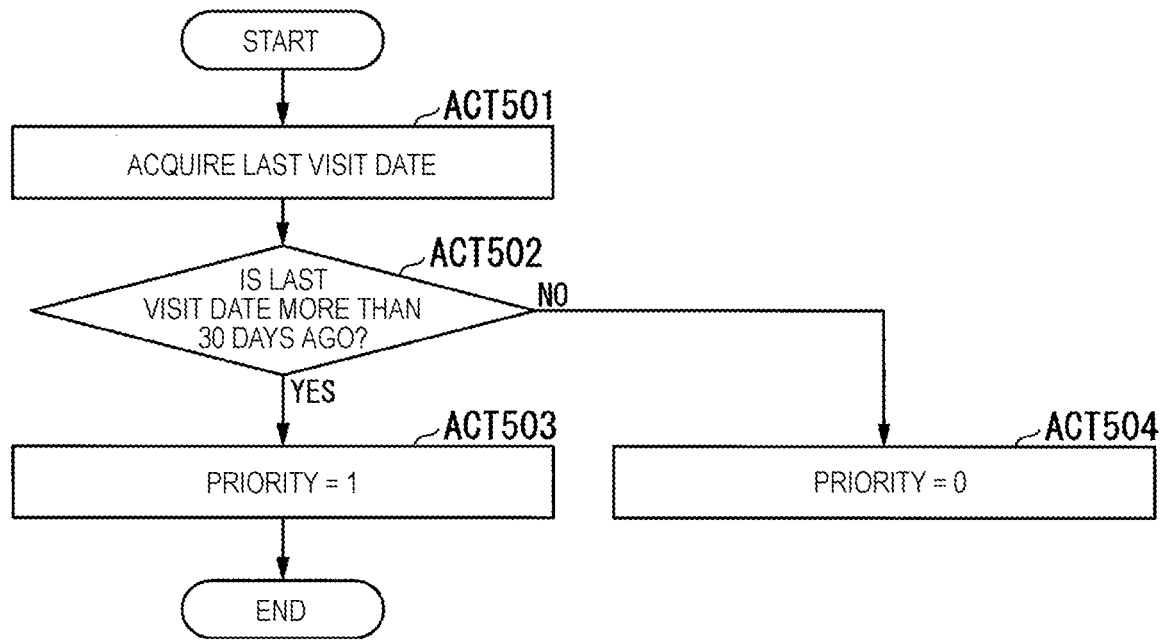
FIG. 15 is a flowchart of a priority calculation process based on a last visit date according to an embodiment.

Referring back to FIG. 11, the description of the flowchart will be continued. The processor 304 determines a priority based on the last visit date (ACT 110). Specifically, the processor 304 determines a priority based on a flowchart shown in FIG. 15. FIG. 15 is a flowchart of a priority calculation process based on the last visit date according to an embodiment. The processor 304 acquires the last visit date (ACT 501). Specifically, the processor 304 retrieves the maintenance information table from the storage device 303. The processor 304 acquires maintenance information with the latest date and time associated with the predetermined manufacturing information from the maintenance information records included in the maintenance information table. The processor 304 acquires the date and time of the acquired maintenance information as the last visit date. The processor 304 determines whether the last visit date is 30 days or more ago (ACT 502). The determination condition is not limited to the last visit date being 30 days or more ago. For example, the determination condition may be that the last visit date is 20 days or more ago or that the last visit date is 40 days or more ago. When the last visit date is 30 days or more ago (ACT 502: YES), the processor 304 determines that the priority based on the last visit date is 1 (ACT 503). When the last visit date is not 30 days or more ago (ACT 502: NO), the processor 304 determines that the priority based on the last visit date is 0 (ACT 504). The determined priority is not limited to 1 or 0. The determined priority may have a value other than 1 or 0. The processor 304 may weight the priority based on how many days ago the last visit date was from the present. In addition, the processor 304 may weight the priority based on the maintenance work performed during the last visit. The processor 304 may acquire the last visit date from an external communication device via the external interface 301.

Figure 16:
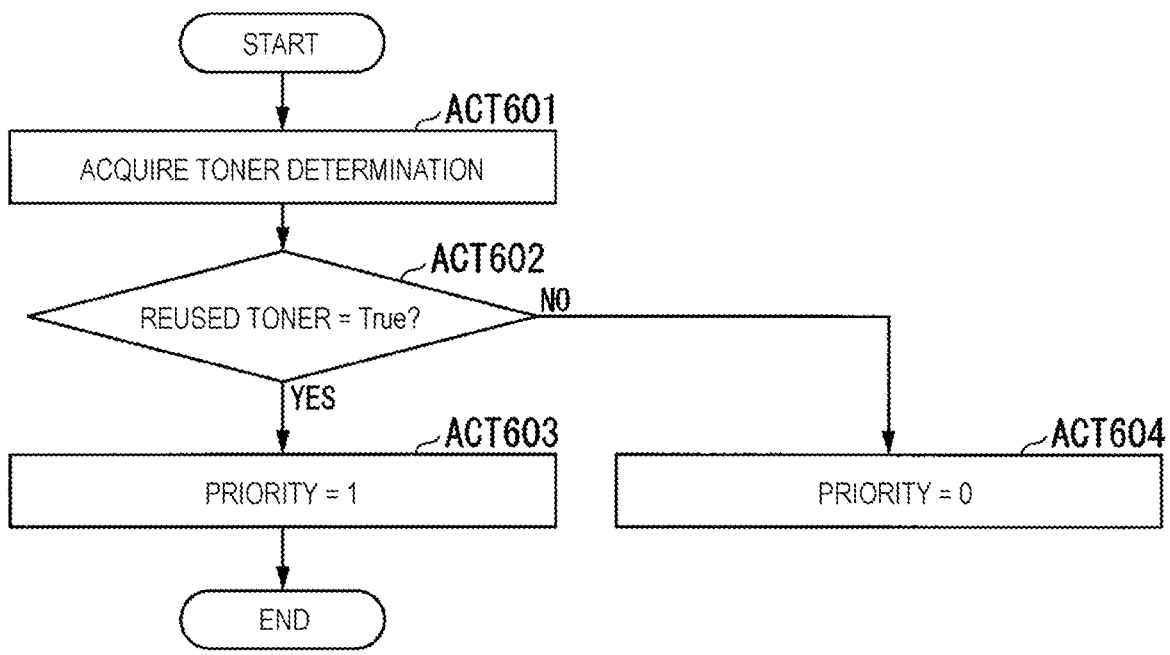
FIG. 16 is a flowchart of a priority calculation process based on reused toner determination according to an embodiment.

Referring back to FIG. 11, the description of the flowchart will be continued. The processor 304 determines a priority based on the reused toner determination (ACT 111). Specifically, the processor 304 determines a priority based on a flowchart shown in FIG. 16. FIG. 16 is a flowchart of a priority calculation process based on the reused toner determination according to an embodiment. The processor 304 acquires reused toner determination (ACT 601). Specifically, the processor 304 retrieves the image forming apparatus table from the storage device 303. The processor 304 acquires a value of reused toner determination of the image forming apparatus record having the predetermined manufacturing information from the image forming apparatus records included in the image forming apparatus table. The processor 304 determines whether the acquired reused toner determination is True (ACT 602). When the reused toner determination is True (ACT 602: YES), the processor 304 determines that the priority based on the reused toner determination is 1 (ACT 603). When the reused toner determination is not True (ACT 602: NO), the processor 304 determines that the priority based on the reused toner determination is 0 (ACT 604). The determined priority is not limited to 1 or 0. The determined priority may have a value other than 1 or 0.

Figure 17:
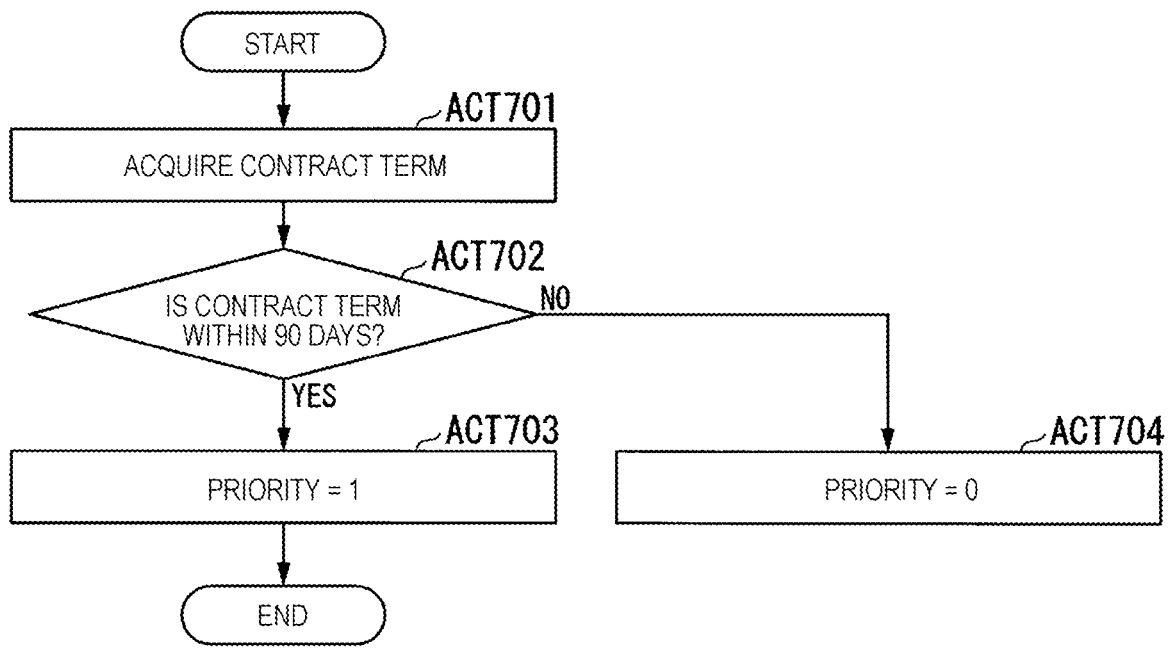
FIG. 17 is a flowchart of a priority calculation process based on a contract term according to an embodiment.

Referring back to FIG. 11, the description of the flowchart will be continued. The processor 304 determines a priority based on the contract term (ACT 112). Specifically, the processor 304 determines a priority based on a flowchart shown in FIG. 17. FIG. 17 is a flowchart of a priority calculation process based on a contract term according to an embodiment. The processor 304 acquires a contract term (ACT 701). Specifically, the processor 304 retrieves the image forming apparatus table from the storage device 303. The processor 304 acquires the contract term value of the image forming apparatus record having the predetermined manufacturing information from the image forming apparatus records included in the image forming apparatus table. The processor 304 determines whether the acquired contract term is a date within 90 days from the present (ACT 702). The determination condition is not limited to the contract term being a date within 90 days from the present. For example, as the determination condition, the contract term may be within 60 days from the present or the contract term may be within 120 days from the present. When the contract term is within 90 days (ACT 702: YES), the processor 304 determines that the priority based on the contract term is 1 (ACT 703). When the contract term is not within 90 days (ACT 702: NO), the processor 304 determines that the priority based on the contract term is (ACT 704). The determined priority is not limited to 1 or 0. The determined priority may be a value other than 1 or 0. The processor 304 may acquire a contract term from an external communication device via the external interface 301. In addition, the processor 304 may weight the priority by the user.

Figure 18:
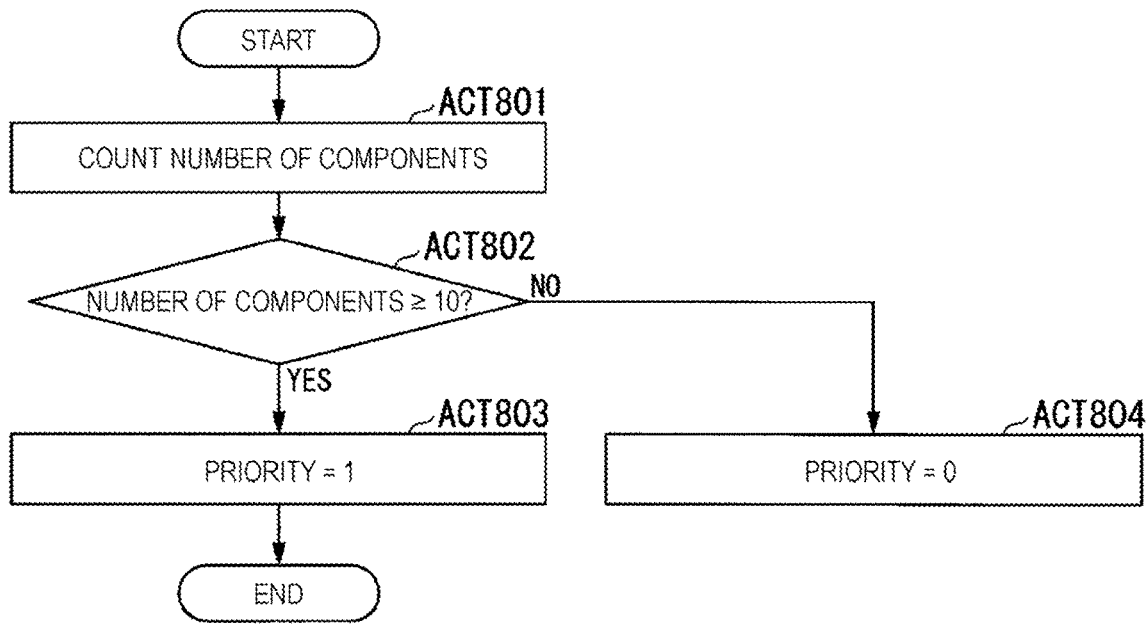
FIG. 18 is a flowchart of a priority calculation process based on the number of components according to an embodiment.

Referring back to FIG. 11, the description of the flowchart will be continued. The processor 304 determines a priority based on the number of components whose counter values exceed the component service life counter values (ACT 113). Specifically, the processor 304 determines a priority based on a flowchart shown in FIG. 18. FIG. 18 is a flowchart of a priority calculation process based on the number of components according to an embodiment. The processor 304 counts the number of components whose counter values exceed the component service life counter values (ACT 801). Specifically, the processor 304 retrieves the component counter table from the storage device 303. The processor 304 acquires the counter values of all the component counter records having the predetermined manufacturing information and the corresponding component service life counter values from the component counter records. Next, the processor 304 compares the obtained counter value with the component service life counter value. The processor 304 counts the number of component counter records indicating a counter value larger than the component service life counter value. The processor 304 determines whether the number of counted components is 10 or more (ACT 802). The determination condition is not limited to the number of components being 10 or more. For example, as the determination condition, the number of components may be 5 or more or the number of components may be 15 or more. When the number of components is 10 or more (ACT 802: YES), the processor 304 determines that the priority based on the number of components is 1 (ACT 803). When the number of components is not 10 or more (ACT 802: NO), the processor 304 determines that the priority based on the number of components is 0 (ACT 804). The determined priority is not limited to 1 or 0. The determined priority may be a value other than 1 or 0. The processor 304 may weight the priority based on the counted number of components. The processor 304 may weight the priority based on the type of the component.

Figure 19:
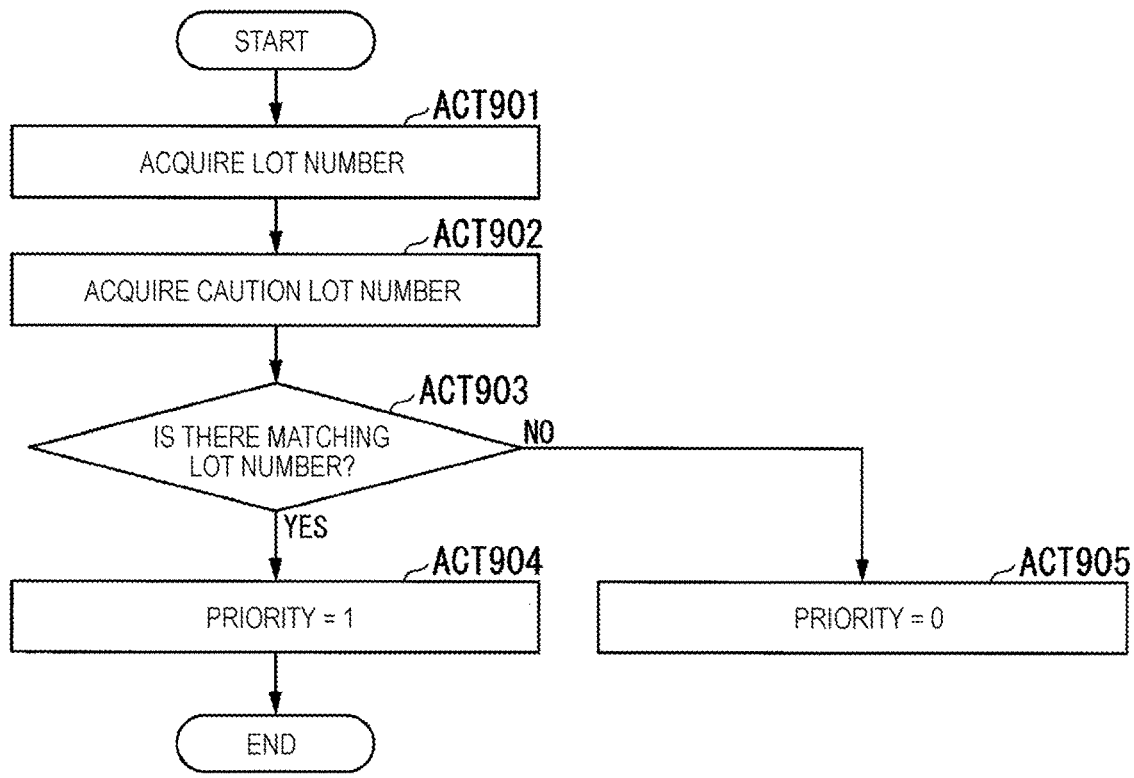
FIG. 19 is a flowchart of a priority calculation process based on a manufacturing lot number according to an embodiment.

Referring back to FIG. 11, the description of the flowchart will be continued. The processor 304 determines a priority based on the manufacturing lot number (ACT 114). Specifically, the processor 304 determines a priority based on a flowchart shown in FIG. 19. FIG. 19 is a flowchart of a priority calculation process based on a manufacturing lot number according to an embodiment. The processor 304 acquires a manufacturing lot number of a component of the image forming apparatus 100 (ACT 901). Specifically, the processor 304 retrieves the component counter table from the storage device 303. The processor 304 acquires the component names and the manufacturing lot numbers of all the component counter records having the predetermined manufacturing information among the component counter records included in the component counter table. The processor 304 acquires the caution lot number of the component of the image forming apparatus 100 (ACT 902). Specifically, the processor 304 retrieves the caution lot table from the storage device 303. The processor 304 acquires the component names and the caution lot numbers of all the caution lot records having the component names acquired in ACT 901 among the caution lot records included in the caution lot table. The processor 304 determines whether there are matching manufacturing lot number and caution lot number (ACT 903). When there are matching manufacturing lot number and caution lot number (ACT 903: YES), the processor 304 determines that the priority based on the manufacturing lot number is 1 (ACT 904). When there are no matching manufacturing lot number and caution lot number (ACT 903: NO), the processor 304 determines that the priority based on the manufacturing lot number is 0 (ACT 905). The determined priority is not limited to 1 or 0. The determined priority may be a value other than 1 or 0. The processor 304 may acquire the caution lot number from an external communication device via the external interface 301.

Figure 20:
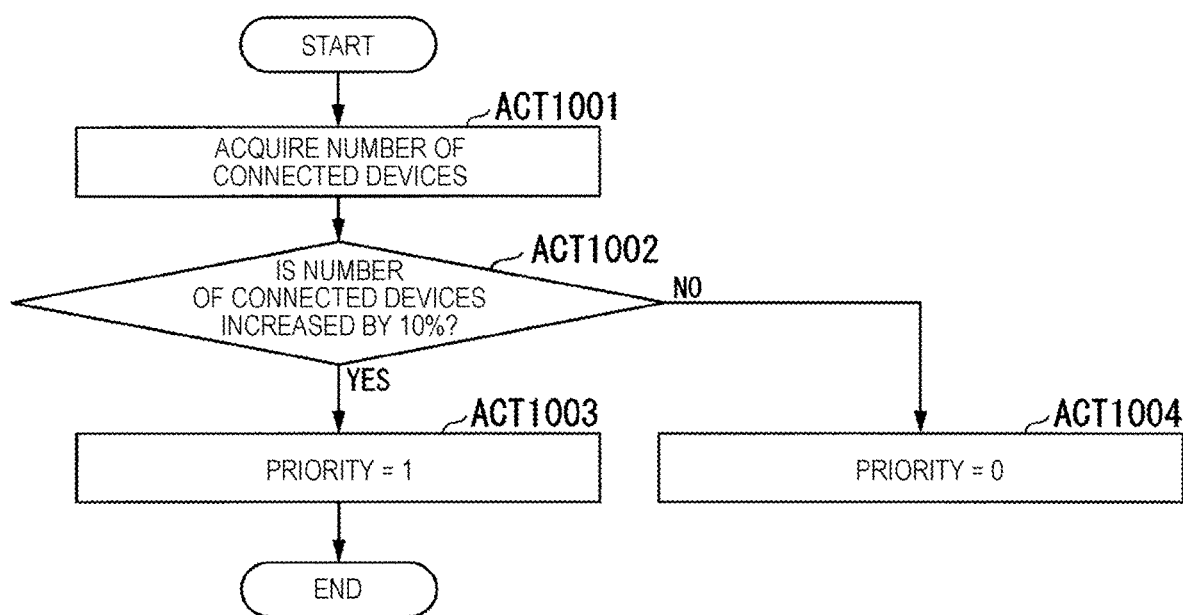
FIG. 20 is a flowchart of a priority calculation process based on the number of connected devices according to an embodiment.

Referring back to FIG. 11, the description of the flowchart will be continued. The processor 304 calculates a priority based on the number of connected devices (ACT 115). Specifically, the processor 304 determines a priority based on a flowchart shown in FIG. 20. FIG. 20 is a flowchart of a priority calculation process based on the number of connected devices according to an embodiment. The processor 304 acquires the number of connected devices (ACT 1001). Specifically, the processor 304 retrieves the connected device number table from the storage device 303. The processor 304 acquires a connected device number record indicating the latest date and time and a connected device number record indicating the date and time immediately before the latest date and time from the connected device number records having the predetermined manufacturing information from the connected device number record included in the connected device number table. Next, the processor 304 acquires the value of the number of connected devices in the two acquired connected device number records. The processor 304 determines whether the connected device number value is increased by 10% or more (ACT 1002). The determination condition is not limited to the number of connected devices being increased by 10% or more. For example, the determination condition may be the number of connected devices being increased by 15% or more or the number of connected devices being increased by 5% or more. When the number of connected devices is increased by 10% or more (ACT 1002: YES), the processor 304 determines that the priority based on the number of connected devices is 1 (ACT 1003). When the number of connected devices is not increased by 10% or more (ACT 1002: NO), the processor 304 determines that the priority based on the number of connected devices is 0 (ACT 1004). The determined priority is not limited to 1 or 0. The determined priority may be a value other than 1 or 0. The processor 304 may weight the priority based on the type of the connected terminal. The processor 304 may use another value such as the number of connected devices itself or the number of increased devices instead of the increase rate.

Referring back to FIG. 11, the description of the flowchart will be continued. The processor 304 calculates a maintenance priority based on the priority determined by the ACTS 107 to 115 (ACT 116). Specifically, the processor 304 calculates the maintenance priority based on the following Expression (1):

$$Y = \Sigma(x_n \times k_n)$$

The value "Y" in Expression (1) is the calculated maintenance priority. The value "$x_n$" in Expression (1) corresponds to the priority determined by ACTS 107 to 115. The value "$k_n$" in Expression (1) is a predetermined weighting coefficient. The predetermined weighting coefficient is recorded in the storage device 303 in advance for each condition. That is, the processor 304 calculates, as the maintenance priority, a total sum obtained by multiplying each determined priority ($x_n$) by a corresponding weighting coefficient ($k_n$) based on Expression (1). The processor 304 may normalize the calculated maintenance priority so that the priority falls within a range of 0 to 100. The processor 304 may be configured to dynamically obtain the weight coefficient.

The processor 304 records the calculated maintenance priority in the storage device 303 (ACT 117). Specifically, the processor 304 searches the image forming apparatus table stored in the storage device 303 for the image forming apparatus record having the predetermined manufacturing information. The processor 304 then stores the calculated maintenance priority as the maintenance priority in the located image forming apparatus record.

The processor 304 may be configured to calculate the maintenance priority based on any two or more pieces of information from the number of errors, the important month, the call generation rate, the last visit date, the reused toner determination, the contract term, number of components, the manufacturing lot number, and the number of connected devices described above. The processor 304 may be configured to calculate the maintenance priority based on any number of pieces of the above information.

The processor 304 may categorize the number of errors, the important month, the call generation rate, the last visit date, the reused toner determination, the contract term, the number of components, the manufacturing lot number, and the number of connected devices into a plurality of categories. In such a case, the processor 304 may be configured to calculate the maintenance priority based on one or more pieces of information included in each category. Specifically, the processor 304 may categorize each information into the following three types: apparatus information, user information, and contract information. For example, the apparatus information is information indicating a state of the image forming apparatus 100, which is a target to be maintained by a maintenance person. The apparatus information includes, for example, the number of errors, the reused toner determination, the manufacturing lot number, the number of components, and the last visit date. The user information is information related to a user of the image forming apparatus 100. The user information includes, for example, the important month, the call generation rate, and the number of connected devices. The contract information is information on a contract between a maintenance provider and a user. The contract information includes, for example, the contract term. The processor 304 acquires one or more pieces of information included in the apparatus information, the user information, and the contract information, respectively. The processor 304 calculates the maintenance priority based on the acquired information.

Whether the image forming apparatus 100 can be maintained according to the maintenance priority calculated by the maintenance support apparatus 300 depends on the power of the maintenance person who performs the maintenance. In a case of a large scale user, the apparatuses may be assigned to different maintenance persons for each region. For example, the large scale user has a plurality of places of business in a plurality of different regions. Such a large scale user may have subsidiaries across countries. For this reason, even when the maintenance support apparatus 300 calculates the maintenance priority, there is a possibility that a region where a large amount of maintenance is available and a region where the maintenance is insufficient may appear. In such a case, the quality of maintenance for the same user may vary depending on the regions, which negatively affects the reputation of the user. Therefore, it is required to maintain a certain level of maintenance quality when a plurality of maintenance persons are responsible for maintenance for an image forming apparatuses 100 of the same user. Therefore, the processor 304 of the maintenance support apparatus 300 periodically corrects the calculated maintenance priority.

Figure 21:
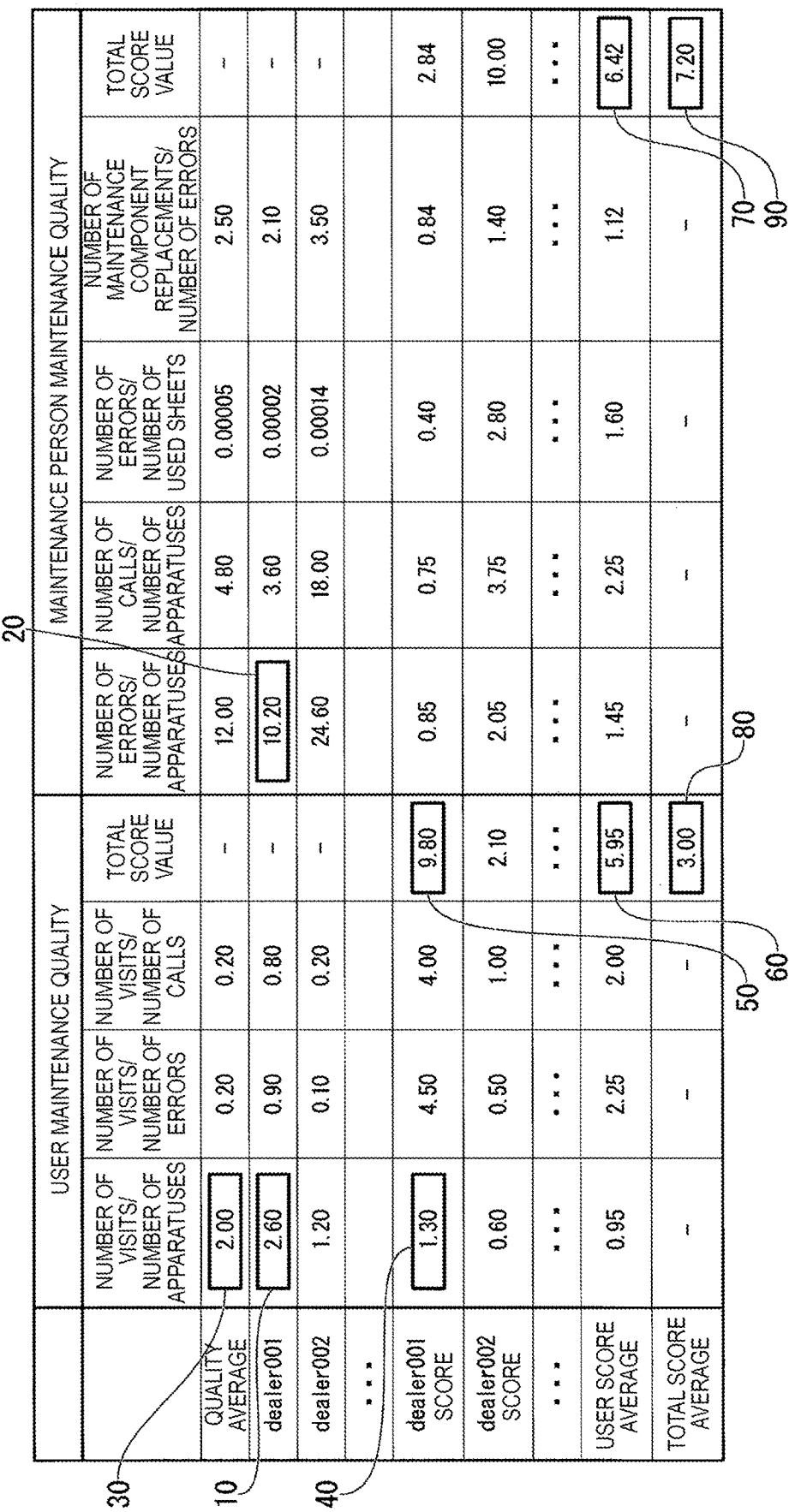
FIG. 21 is a diagram showing a quality information table according to an embodiment.

FIG. 21 is a diagram showing a quality information table according to an embodiment. The processor 304 generates a quality information table based on various types of information recorded in the storage device 303. The quality information table is generated for each user. The processor 304 corrects the maintenance priority based on each value of the generated quality information table. The generation of the quality information table will be described later.

Figure 22:
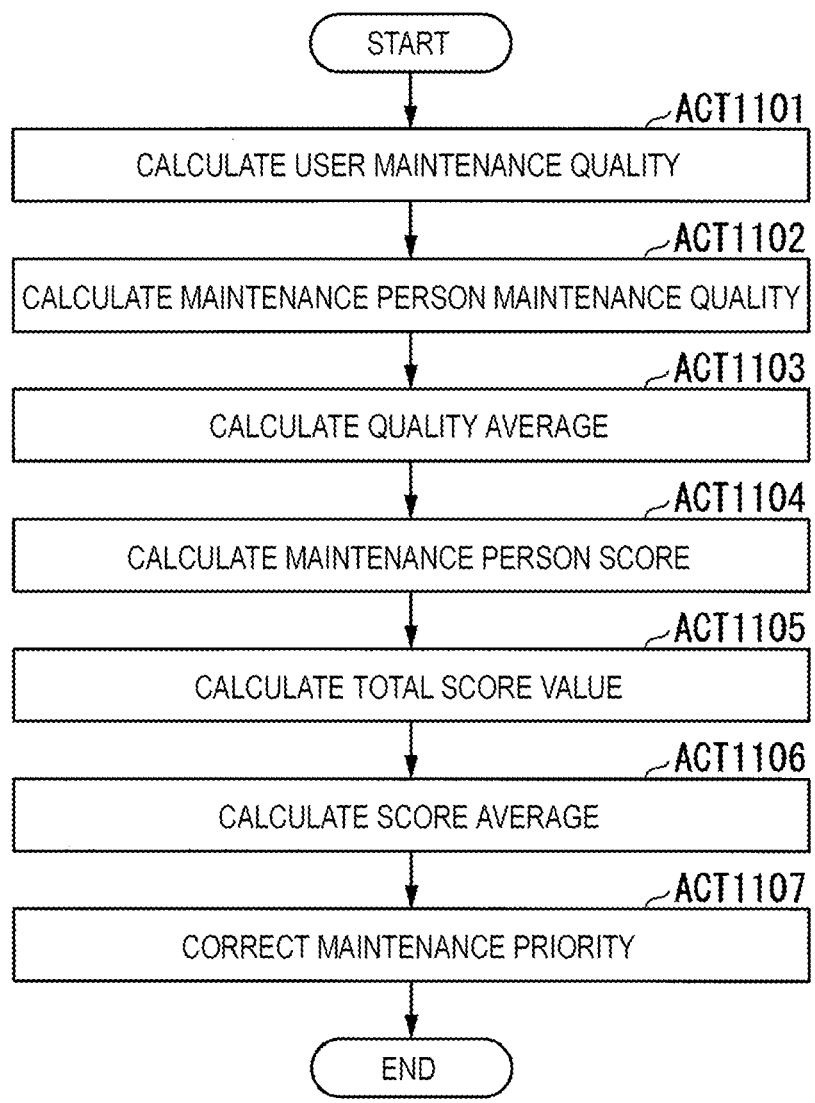
FIG. 22 is a flowchart of a maintenance priority correction process according to an embodiment.

FIG. 22 is a flowchart of a maintenance priority correction process according to an embodiment. As an example of the correction of the maintenance priority, a case where the quality information table of FIG. 21 is generated will be described. The correction of the maintenance priority is executed at a predetermined timing. The predetermined timing may be a predetermined timing, for example, every month, every six months, or every year. The predetermined timing may be, for example, a timing at which a maintenance priority correction instruction is input via the input unit 305.

The processor 304 of the maintenance support apparatus 300 calculates the user maintenance quality (ACT 1101). The user maintenance quality is an index indicating the quality of maintenance for the user. The higher the value of the user maintenance quality, the higher the quality of maintenance as seen from the user. The user maintenance quality is calculated for each maintenance person. The user maintenance quality is calculated for each index related to the maintenance quality. Specifically, the processor 304 calculates each index of the user maintenance quality based on the following Expressions (2), (3) and (4).

(Number of visits)/(Number of image forming apparatuses 100)     Expression (2):

(Number of visits)/(Number of errors)     Expression (3):

(Number of visits)/(Number of calls)     Expression (4):

The number of visits indicates the number of times a maintenance person has visited the user within a predetermined period. The processor 304 counts the number of visits based on the maintenance information table recorded in the storage device 303, as shown in FIG. 10. For example, the processor 304 counts the number of visits based on the number of maintenance information records indicating the image forming apparatus 100 of which the date and time is within the predetermined period and which is maintained by the same maintenance person. The predetermined period may be, for example, the latest one month or six months. The predetermined period may be any predetermined period. The number of the image forming apparatuses 100 is the number of the image forming apparatuses 100 maintained by each maintenance person for the user. The processor 304 counts the number of the image forming apparatuses 100 based on the image forming apparatus table recorded in the storage device 303, as shown in FIG. 4. For example, the processor 304 counts the number of image forming apparatus records indicating the user ID of the user and the maintenance person ID of the maintenance person. The number of errors is the number of errors that have occurred in the image forming apparatus 100 within the predetermined period. The processor 304 counts the number of predetermined error information records as the number of errors based on the error information table recorded in the storage device 303, as shown in FIG. 5. The predetermined error information record is an error information record indicating that the image forming apparatus 100 of the user for whom the quality information table is to be generated is maintained by a maintenance person within the predetermined period. The number of calls is the number of calls received from the user within the predetermined period. The processor 304 counts the number of predetermined call information records as the number of calls based on the call information table recorded in the storage device 303, as shown in FIG. 9. The predetermined call information record is a call information record associated with the user for whom the quality information table is to be generated within the predetermined period.

The processor 304 records the values calculated based on Expressions (2) to (4) in the quality information table for each maintenance person. For example, the processor 304 records the value calculated based on Expression (2) in a field 10 for a maintenance person identified by a maintenance person ID "dealer 001". In this manner, the processor 304 generates the quality information table by calculating the user maintenance quality for each maintenance person.

The processor 304 of the maintenance support apparatus 300 calculates maintenance person maintenance quality (ACT 1102). The maintenance person maintenance quality is an index indicating the quality of maintenance as seen from a maintenance person. The lower the value of maintenance person maintenance quality, the higher the quality of maintenance from the viewpoint of the maintenance person. The maintenance person maintenance quality is calculated for each maintenance person. The maintenance person maintenance quality is calculated for each quality related index. Specifically, the processor 304 calculates each index of the maintenance person maintenance quality based on the following Expressions (5), (6), (7), and (8).

(Number of errors)/(Number of image forming apparatuses 100)     Expression (5):

(Number of calls)/(Number of image forming apparatuses 100)     Expression (6):

(Number of errors)/(Number of used sheets)     Expression (7):

(Number of maintenance component replacements)/(Number of errors)     Expression (8):

The index values calculated according to Expressions (5), (6), and (7) indicate the extent to which subsequent maintenance is performed to suppress the occurrence of errors. The index values calculated according to Expression (8) indicates whether a component is unnecessarily replaced.

The number of used sheets indicates the number of pages printed or read by the image forming apparatus 100. The processor 304 calculates the number of used sheets based on the image forming apparatus table recorded in the storage device 303, as shown in FIG. 4. For example, the processor 304 obtains an image forming apparatus record indicating the user ID of the user for whom the quality information table is to be generated and indicating the maintenance person ID. The processor 304 acquires the values of the number of printed sheets and the number of read sheets of the acquired image forming apparatus record. The processor 304 calculates the total sum of the acquired number of printed sheets and the number of read sheets as the number of used sheets. The number of maintenance component replacements indicates the total number of components replaced within the predetermined period. The processor 304 calculates the number of maintenance component replacements based on the component counter table recorded in the storage device 303, as shown in FIG. 7. For example, the processor 304 acquires a predetermined component counter record indicating manufacturing information of the image forming apparatus 100 of the user for whom the quality information table is to be generated. The predetermined component counter record is a component counter record indicating that the replacement date is within the predetermined period. The processor 304 counts the number of acquired component counter records for each maintenance person. The processor 304 sets the counted value as the number of maintenance component replacements.

The processor 304 calculates the average number of visits that have been required to solve an issue reported by one call as an index of the maintenance person maintenance quality. That average number of visits is an index for reducing unnecessary visits with proper maintenance. The processor 304 records, in the quality information table, values calculated based on Expressions (5) to (8) and the average number of visits that have required to solve an issue reported by one call, for each maintenance person. For example, the processor 304 records the value calculated based on Expression (5) in a field 20 for the maintenance person identified by the maintenance person ID "dealer 001". In this manner, the processor 304 generates the quality information table by calculating the maintenance person maintenance quality for each maintenance person.

The processor 304 calculates a quality average (ACT 1103). The quality average is an average value for each index related to the user maintenance quality or the maintenance person maintenance quality. Specifically, the processor 304 calculates, as a quality average, an average value of each index of the user maintenance quality and the maintenance person maintenance quality calculated for all the maintenance persons registered in the maintenance support apparatus 300 including the maintenance person not in charge of the user. For example, the processor 304 calculates, as the quality average of "Number of visits/Number of apparatuses", an average value based on values of "Number of visits/Number of apparatuses" for all maintenance persons, such as a value of 2.60 for dealer 001 and a value of 1.20 for dealer 002. The processor 304 records a calculated average value of 2.00 in a field 30. The processor 304 similarly calculates the quality average for other indices.

The processor 304 calculates a maintenance person score (ACT 1104). The maintenance person score is a value for comparing the quality of maintenance performed by each maintenance person. Specifically, the processor 304 calculates the maintenance person score by dividing the value of each index of the user maintenance quality by the quality average. For example, the processor 304 calculates a maintenance person score related to "Number of visits/Number of apparatuses" of dealer 001 by dividing a value of 2.60 shown in the field 10 by a value of 2.00 shown in the field 30. The processor 304 records a calculated value of 1.30 in a field 40. The processor 304 similarly calculates the maintenance person score for other indices and other maintenance persons. The processor 304 also calculates the maintenance person score for the maintenance person maintenance quality.

The processor 304 calculates a total score value (ACT 1105). The total score value is a total value of the calculated maintenance person scores. As stated above, the processor 304 calculates the maintenance person score by dividing the value of each index of the user maintenance quality by the quality average. For example, the processor 304 calculates the total score value of the user maintenance quality of dealer 001 by adding a value of "Number of visits/Number of apparatuses" of 1.30, a value of "Number of visits/Number of errors" of 4.50, and a value of "Number of visits/Number of calls" of 4.00. The processor 304 records the calculated total score value of 9.80 in a field 50. The processor 304 similarly calculates the total score values of the other maintenance persons. The processor 304 also calculates the total score values of the maintenance person maintenance quality.

The processor 304 calculates a user score average and a total score average (ACT 1106). The user score average is an average value of the calculated total score values. The user score average is calculated for each of the user maintenance quality and the maintenance person maintenance quality. Specifically, the processor 304 acquires the total score value of the user maintenance quality. For example, the processor 304 acquires the total score value of 9.80 for the dealer 001 score, the total score value of 2.10 for the dealer 002 score, and the like. The processor 304 calculates an average value of the acquired total score values. The processor 304 records the calculated average value of 5.95 as a user score average in a field 60. Further, the processor 304 calculates the user score average related to the maintenance person maintenance quality. The processor 304 acquires the total score value of the maintenance person maintenance quality. For example, the processor 304 acquires the total score value of 2.84 for the dealer 001 score, the total score value of 10.00 for the dealer 002 score, and the like. The processor 304 calculates an average value of the acquired total score values. The processor 304 records the calculated average value of 6.42 in a field 70 as the user score average.

Next, the processor 304 calculates the total score average. The total score average is the average value of the total score calculated for all maintenance persons registered in the maintenance support apparatus, including the maintenance person who is not in charge of the user. Specifically, the processor 304 acquires all the values of the maintenance person score related to the user maintenance quality. For example, the processor 304 acquires a maintenance person score (1.30, 4.50, 4.00) for the dealer 001 score, a maintenance person score (0.6, 0.5, 1.00) for the dealer 002 score, and the like. The processor 304 calculates an average value of the acquired maintenance person scores. The processor 304 records the calculated average value of 3.00 in a field 80 as the total score average.

In addition, the processor 304 calculates a total score average related to the maintenance person maintenance quality. Specifically, the processor 304 acquires all the values of the maintenance person score related to the maintenance person maintenance quality. For example, the processor 304 acquires a maintenance person score (0.85, 0.75, . . . ) for the dealer 001 score, and a maintenance person score (2.05, 3.75, . . . ) for the dealer 002 score. The processor 304 calculates the average value of the acquired maintenance person scores. The processor 304 records the calculated average value of 7.20 in a field 90 as the total score average.

The processor 304 performs a correction of the first maintenance priority based on the generated quality information table (ACT 1107). Specifically, the processor 304 obtains the total score value of the user maintenance quality of each maintenance person from the quality information table. The processor 304 compares the obtained total score value with the total score average (value in the field 80) of the quality information table. Further, the processor 304 compares the acquired total score value with the user score average (the value of the field 60) in the quality information table. The processor 304 performs maintenance priority correction determination based on the comparison table shown in FIG. 23. FIG. 23 is a diagram showing a table for determining how to correct the maintenance priority based on the total score value with the score average of the user maintenance quality. When the total score value is higher than the total score average and the total score value is significantly higher (e.g., 30% higher) than the user score average, the processor 304 determines to lower the maintenance priority. When the total score value is higher than the total score average and the total score value is significantly lower than the user score average, the processor 304 determines not to correct the maintenance priority. When the total score value is lower than the total score average and the total score value is significantly higher than the user score average, the processor 304 determines not to correct the maintenance priority. When the total score value is lower than the total score average and the total score value is significantly lower than the user score average, the processor 304 determines to increase the maintenance priority. This determination is performed for each maintenance person who maintains the image forming apparatus of the user.

Next, the processor 304 compares the score average value of the maintenance person maintenance quality with the total score value. The processor 304 compares the total score value of each maintenance person with the total score average (value in the field 90) of the quality information table. Further, the processor 304 compares the total score value of each maintenance person with the user score average (the value of the field 70) in the quality information table. The processor 304 performs second maintenance priority correction determination based on the comparison table shown in FIG. 24. FIG. 24 is a diagram showing a table for determining how to correct the maintenance priority based on the score average of maintenance person maintenance quality according to an embodiment. When the total score value is higher than the total score average and the total score value is significantly higher than the user score average, the processor 304 determines to increase the maintenance priority. When the total score value is higher than the total score average and the total score value is significantly lower than the user score average, the processor 304 determines not to correct the maintenance priority. When the total score value is lower than the total score average and the total score value is significantly higher than the user score average, the processor 304 determines not to correct the maintenance priority. When the total score value is lower than the total score average and the total score value is significantly lower than the user score average, the processor 304 determines to lower the maintenance priority. This determination is performed for each maintenance person who maintains the image forming apparatus of the user.

Since the processor 304 compares the score average with the maintenance priority, the maintenance priority is higher or lower than the score average in almost all patterns. For this reason, the processor 304 can suppress the frequency of correction of the maintenance priority by comparison based on a certain coefficient. For example, the processor 304 may regard a case where the value exceeds±30% from the score average as "significantly higher or lower". In this case, the processor 304 can suppress an increase in maintenance costs due to excessive priority adjustment while suppressing the maintenance unevenness to the user within a certain range.

The processor 304 performs maintenance priority correction based on the first comparison result and the second comparison result. The first comparison result is a result obtained by comparing the score average with respect to the user maintenance quality and the total score value. The second comparison result is a result obtained by comparing the score average and the total score value of the maintenance person maintenance quality.

First, a case where the first comparison result indicates a result of performing correction for increasing the maintenance priority (that is, the processor 304 determines to increase the maintenance priority according to the table shown in FIG. 23) will be described. In such a case, when the processor 304 determines to increase the maintenance priority based on the second comparison result using the table shown in FIG. 24, the processor 304 increases the maintenance priority. When the processor 304 determines to lower the maintenance priority based on the second comparison result, the processor 304 does not correct the maintenance priority. When the processor 304 determines not to correct the maintenance priority based on the second comparison result, the processor 304 increases the maintenance priority.

Next, a case where the first comparison result indicates a result of not correcting the maintenance priority will be described (that is, the processor 304 determines not to correct the maintenance priority according to the table shown in FIG. 23). In such a case, when the processor 304 determines to increase the maintenance priority based on the second comparison result, the processor 304 increases the maintenance priority. When the processor 304 determines to lower the maintenance priority based on the second comparison result, the processor 304 lowers the maintenance priority. When the processor 304 determines not to correct the maintenance priority based on the second comparison result, the processor 304 does not correct the maintenance priority.

Next, a case where the first comparison result indicates a result of performing correction for lowering the maintenance priority will be described (that is, the processor 304 determines to lower the maintenance priority according to the table shown in FIG. 23). In this case, when the processor 304 determines to increase the maintenance priority based on the second comparison result, the processor 304 does not correct the maintenance priority. When the processor 304 determines to lower the maintenance priority based on the second comparison result, the processor 304 lowers the maintenance priority. When the processor 304 determines not to correct the maintenance priority based on the second comparison result, the processor 304 lowers the maintenance priority. The processor 304 updates the image forming apparatus table using the corrected maintenance priority.

In the maintenance support system 1 configured as described above, the processor 304 of the maintenance support apparatus 300 calculates the maintenance priority based on at least one of the apparatus information, the user information, and the contract information. The processor 304 records the calculated maintenance priority in the storage device 303. The maintenance person can determine which image forming apparatus 100 should be given priority for maintenance based on the maintenance priority.

When a user has a plurality of image forming apparatuses 100 and receives maintenance from a plurality of maintenance persons, the processor 304 calculates the maintenance quality for the user for each maintenance person. The processor 304 corrects the maintenance priority based on the maintenance quality calculated for each maintenance person. With this configuration, even when a plurality of maintenance persons are assigned to the user, it is possible to maintain the quality of maintenance provided by each maintenance person to be within a certain level. In addition, by maintaining the maintenance quality within a certain range without unevenness, it is possible to suppress an increase in maintenance costs due to excessive increase in the maintenance priority.

The processor 304 may be configured to exclude a predetermined image forming apparatus 100 from the calculation of the maintenance priority correction. The predetermined image forming apparatus 100 may be, for example, an image forming apparatus 100 that has just been delivered. The predetermined image forming apparatus 100 may be, for example, an image forming apparatus 100 that is known or expected to operate without errors for a long period of time and for which there has been no on-site maintenance and no call to a call center. Thus, the predetermined image forming apparatus 100 to be excluded may be an image forming apparatus 100 for which the maintenance quality cannot be calculated due to lack of information stored in the storage device 303.

The processor 304 may be configured not to calculate a predetermined index related to the user maintenance quality or the maintenance person maintenance quality according to the contract contents between the user and the maintenance provider. For example, a case where a maintenance provider concludes a contract with a user by which a visit time from the occurrence of a failure to the restarting of operations is determined will be described. In such a case, the processor 304 does not use the visit time to calculate a predetermined index related to the user maintenance quality or the maintenance person maintenance quality. When there is a contract term related to the visit time such as "within 24 hours" or "within 72 hours", the user often pays a higher contract fee for "within 24 hours" than for "within 72 hours". In such a case, the processor may determine that the quality of inexpensive but delayed maintenance is equivalent to that of expensive but immediate maintenance, thereby preventing the value of the expensive plan from being damaged.

The processor 304 may be configured to execute the maintenance priority correction at predetermined intervals. The predetermined interval may be, for example, one week or one month. With this configuration, the processor 304 can reduce the load associated with the maintenance priority correction.

The processor 304 may set a period for various values for calculating each index related to the user maintenance quality or the maintenance person maintenance quality. For example, only information for the past one year from the present may be used for the calculation. For example, when the processor 304 uses the accumulated value from the beginning of use of the image forming apparatus 100, in a case where the quality has been improved or reduced during the use, the reflection on the maintenance priority becomes insufficient. With this configuration, the maintenance support system 1 can correct the maintenance priority by reflecting the recent state more accurately.

The quality information table is described for a case where the maintenance person scores for all the maintenance persons are calculated. However, the quality information table may be generated to calculate maintenance person scores for some maintenance persons. Such maintenance persons are, for example, the maintenance persons located in a particular country or all maintenance persons located in a particular region. For example, when a user's places of business are located throughout a specific country such as Japan, it is desirable to calculate the scores for all maintenance persons located in Japan. When a user's places of business are located in a plurality of adjacent countries such as is often the case in Europe, since the quality of maintenance provided by maintenance persons may vary depending on the countries, it is desirable to calculate the scores for all maintenance persons working in those countries. When a user's places of business are located all over the world, it may be required to provide the same quality service regardless of the site locations being in different countries, and thus it is desirable to calculate the scores for the maintenance persons in all relevant countries. The conditions for these users may be limited to any one condition. The condition may be selected according to the base development status of a target user. Further, the processor 304 may set a target numerical value instead of calculating the average in order to improve the quality of maintenance. With this configuration, the maintenance quality can be improved.

The maintenance support apparatus 300 may be implemented using a plurality of information processing apparatuses communicably connected via a network. In such a case, each unit of the maintenance support apparatus 300 may be distributed and implemented in one of the plurality of information processing apparatuses. For example, the storage device 303 and the processor 304 may be implemented in different information processing apparatuses.

Furthermore, the maintenance support system 1 may be used for an apparatus other than an image forming apparatus 100. For example, the maintenance support system 1 may be used for calculating a maintenance priority for a Point Of Sales (POS) terminal and/or other electronic devices or various electromechanical devices.

In each embodiment described above, the described functions are executed by a processor, such as a central processing unit, but, in general, such functions may be provided by a dedicated hardware circuit or device such as an LSI (Large-scale integration).

According to the embodiments described above, the maintenance priority of an image forming apparatus 100 can be appropriately determined by providing the processor 304 and the storage device 303 as disclosed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A maintenance support system, comprising:
a network interface configured to communicate with a plurality of image forming apparatuses that are used by, and are to be maintained for, a plurality of users;
a memory; and
a processor configured to:
acquire, via the network interface:
apparatus information about each of the plurality of image forming apparatuses, the apparatus information indicating the number of errors occurred in the image forming apparatus, a use state of a reused toner in the image forming apparatus, a lot number of each of components attached to the image forming apparatus, the number of the components of which service lives have expired, and a last visit date by a maintenance person for maintenance on the image forming apparatus,
usage information indicating a use state of each of the plurality of image forming apparatuses, the usage information indicating a month in which the image forming apparatus is most frequently used, a call occurrence rate of calls received from the user about the image forming apparatus, and the number of communication devices connected to the image forming apparatus, and
contract information about contracts made with the users to provide maintenance services, the contract information indicating a contract term,
when an error occurs in one of the image forming apparatuses, determine a maintenance priority of the image forming apparatus based on the apparatus information, the usage information, and the contract information, and
record the determined maintenance priority in the memory.

2. The maintenance support system according to claim 1, wherein the memory stores:
an image forming apparatus table which has a plurality of image forming apparatus records each indicating the use state of a reused toner, the contract term, and the call occurrence rate of one of the image forming apparatuses and the month in which the image forming apparatus is most frequently used,
an error information table which has a plurality of error information records corresponding to errors occurred in the plurality of image forming apparatuses,
a connected device number table which has a plurality of connected device number records each including the number of communication devices connected to one of the plurality of image forming apparatuses,
a component counter table which has a plurality of component counter records each including a counter value of a component of one of the plurality of image forming apparatuses,
a caution lot table which has a plurality of caution lot records each indicating a lot number of a specific component that requires caution,
a call information table which has a plurality of call information records each including information about a call received from a user about one of the image forming apparatuses, and
a maintenance information table which has a plurality of maintenance information records each indicating a maintenance service provided on one of the plurality of image forming apparatuses.

3. The maintenance support system according to claim 1, wherein the processor is further configured to:
calculate a first maintenance score for each of a plurality of first maintenance persons who have performed maintenance on one or more of the plurality of image forming apparatuses used by a first user, and
correct the maintenance priority based on the first maintenance scores.

4. The maintenance support system according to claim 3, wherein the processor is further configured to:
calculate a second maintenance score for each of a plurality of second maintenance persons who have not performed maintenance on one or more of the plurality of image forming apparatuses used by the first user,
compare a first average of the first maintenance scores with a second average of the first maintenance scores and the second maintenance scores, and
correct the maintenance priority based on a comparison result of the first and second averages.

5. A method carried out by a maintenance support system configured to communicate with a plurality of image forming apparatuses that are used by, and are to be maintained for, a plurality of users, the method comprising:
acquiring:
apparatus information about each of the plurality of image forming apparatuses, the apparatus information indicating the number of errors occurred in the image forming apparatus, a use state of a reused toner in the image forming apparatus, a lot number of each of components attached to the image forming apparatus, the number of the components of which service lives have expired, and a last visit date by a maintenance person for maintenance on the image forming apparatus,
usage information indicating a use state of each of the plurality of image forming apparatuses, the usage information indicating a month in which the image forming apparatus is most frequently used, a call occurrence rate of calls received from the user about the image forming apparatus, and the number of communication devices connected to the image forming apparatus, and
contract information about contracts made with the users to provide maintenance services, the contract information indicating a contract term;
when an error occurs in one of the image forming apparatuses, determining a maintenance priority of the image forming apparatus based on the apparatus information, the usage information, and the contract information; and
recording the determined maintenance priority in a memory.

6. The method according to claim 5, further comprising:
storing in the memory:
- an image forming apparatus table which has a plurality of image forming apparatus records each indicating the use state of a reused toner, the contract term, and the call occurrence rate of one of the image forming apparatuses and the month in which the image forming apparatus is most frequently used,
- an error information table which has a plurality of error information records corresponding to errors occurred in the plurality of image forming apparatuses,
- a connected device number table which has a plurality of connected device number records each including the number of communication devices connected to one of the plurality of image forming apparatuses,
- a component counter table which has a plurality of component counter records each including a counter value of a component of one of the plurality of image forming apparatuses,
- a caution lot table which has a plurality of caution lot records each indicating a lot number of a specific component that requires caution,
- a call information table which has a plurality of call information records each including information about a call received from a user about one of the image forming apparatuses, and
- a maintenance information table which has a plurality of maintenance information records each indicating a maintenance service provided on one of the plurality of image forming apparatuses.

7. A method carried out by a maintenance support system configured to communicate with a plurality of image forming apparatuses that are used by, and are to be maintained for, a plurality of users, the method comprising:
- acquiring:
  - apparatus information about each of the plurality of image forming apparatuses,
  - usage information indicating a use state of each of the plurality of image forming apparatuses, and
  - contract information about contracts made with the users to provide maintenance services;
- when an error occurs in one of the image forming apparatuses, determining a maintenance priority of the image forming apparatus based on at least one of the apparatus information, the usage information, and the contract information;
- recording the determined maintenance priority in a memory;
- calculating a first maintenance score for each of a plurality of first maintenance persons who have performed maintenance on one or more of the plurality of image forming apparatuses used by a first user; and
- correcting the maintenance priority based on the first maintenance scores.

8. The method according to claim 7, further comprising:
- calculating a second maintenance score for each of a plurality of second maintenance persons who have not performed maintenance on one or more of the plurality of image forming apparatuses used by the first user; and
- comparing a first average of the first maintenance scores with a second average of the first maintenance scores and the second maintenance scores, wherein
- the maintenance priority is corrected based on a comparison result of the first and second averages.

* * * * *